(12) United States Patent
Ghosh et al.

(10) Patent No.: US 10,560,840 B2
(45) Date of Patent: Feb. 11, 2020

(54) SYSTEM AND METHOD FOR PROVIDING DYNAMIC, ADAPTIVE AND COMPOSITE PRIVACY AND SECURITY FOR IOT COMMUNICATION

(71) Applicant: Wipro Limited, Bangalore (IN)

(72) Inventors: Sudipta Ghosh, Kolkata (IN); Swaminathan Seetharaman, Chennai (IN)

(73) Assignee: Wipro Limited, Bangalore (IN)

( * ) Notice: Subject to any disclaimer, the term of this patent is extended or adjusted under 35 U.S.C. 154(b) by 362 days.

(21) Appl. No.: 15/460,995

(22) Filed: Mar. 16, 2017

(65) Prior Publication Data
US 2017/0272940 A1     Sep. 21, 2017

(30) Foreign Application Priority Data
Mar. 18, 2016  (IN) .............................. 201641009608

(51) Int. Cl.
  *H04W 12/02*    (2009.01)
  *H04L 29/06*    (2006.01)
(52) U.S. Cl.
  CPC ............. *H04W 12/02* (2013.01); *H04L 63/02* (2013.01); *H04L 63/0227* (2013.01)
(58) Field of Classification Search
  CPC ........ H04W 12/02; H04W 4/70; H04L 63/02; H04L 63/0227; H04L 63/105; H04L 63/20
  See application file for complete search history.

(56) References Cited

U.S. PATENT DOCUMENTS 9,094,407 B1 *   7/2015   Matthieu ................ H04W 4/70
9,686,240 B1 *   6/2017   Ray ........................ H04L 63/04
(Continued)

OTHER PUBLICATIONS

Skarmeta, A.F., et al., "A decentralized approach for Security and Privacy challenges in the Internet of Things", 2014 *IEEE* World Forum on Internet of Things (WF-IoT), Mar. 2014, pp. 67-72.

(Continued)

*Primary Examiner* — Yonas A Bayou
(74) *Attorney, Agent, or Firm* — Finnegan, Henderson, Farabow, Garrett & Dunner, LLP

(57) ABSTRACT

The present disclosure provides method and system for dynamically adapting privacy and security for IoT communication. The method determines allowance of pre-engagement communication between communicating local entity (CLE) and communicating remote entity (CRE) based on perception information formed for the CRE. The method determines session filters to be applied during pre-engagement communication to identify violations. Further, if interest level for the pre-engagement communication is greater than a predefined threshold, engagement communication is established between the CRE and CLE. During the engagement communication, engagement filters are determined and applied to identify any violations. Further, during the engagement communication, one or more privacy and security related events are identified and actions are also identified to handle the one or more privacy and security related events, for dynamically adapting privacy and security for IoT communication. The actions include terminating the engagement communication, updating perceptions, refining filters and continuing engagement communication.

40 Claims, 11 Drawing Sheets

(56) References Cited

U.S. PATENT DOCUMENTS

| | | | | |
|---|---|---|---|---|
| 9,858,425 | B2* | 1/2018 | Guedalia | H04W 4/023 |
| 2008/0059536 | A1* | 3/2008 | Brock | G06F 21/10 |
| 2008/0146157 | A1* | 6/2008 | Aaron | H04M 1/72566 |
| | | | | 455/66.1 |
| 2009/0030974 | A1* | 1/2009 | Boudreau | H04L 63/104 |
| | | | | 709/203 |
| 2010/0030734 | A1* | 2/2010 | Chunilal | G06Q 10/00 |
| | | | | 707/770 |
| 2011/0185186 | A1* | 7/2011 | Adams | H04L 9/0891 |
| | | | | 713/189 |
| 2013/0021949 | A1* | 1/2013 | Kaal | H04W 48/16 |
| | | | | 370/255 |
| 2014/0181909 | A1* | 6/2014 | Birk | H04L 63/105 |
| | | | | 726/4 |
| 2015/0278546 | A1* | 10/2015 | Uekubo | G06Q 10/10 |
| | | | | 726/28 |

OTHER PUBLICATIONS

Gusmeroli, S., et al., "IoT Access Control Issues: A Capability Based Approach", *IEEE*, Jul. 2012, pp. 787-792.

MaHalle, P.N., et al., "Indentity Authentication and Capability Based Access Control (IACAC) for the Internet of Things", *Journal of Cyber Security and Mobility*, vol. 1, No. 4, pp. 309-348, 2013.

Huang, X., et al., "User interactive Internet of things privacy preserved access control", International Conference for Internet Technology and Secured Transactions, *IEEE*, Dec. 2012, pp. 597-602.

Pohls, H. C., et al., "RERUM: Building a Reliable IoT upon Privacy- and Security-enabled Smart Objects", *IEEE*, Apr. 2014, pp. 122-127.

Generic Adaptive Middleware for Behavior-driven Autonomous Services (GAMBAS) Consortium, "Privacy Preservation Specification 1", Public deliverable D3.1.1, *GAMBAS*, Sep. 30, 2012, Available online: http://www.gambas-ict.eu/download/D3.1.1-Privacy-Preservation-Specification-1.pdf?attredirects=0&d=1.

Neisse, R., et al., "Dynamic Context-Aware Scalable and Trust-based IoT Security, Privacy Framework", Book chapter in Internet of Things—From Research and Innovation to Market Deployment, IERC Cluster Book, *ResearchGate*, Jan. 2015, pp, 199-224.

Evans, D., "The Internet of Things, how the next evolution of the Internet is changing everything"; Apr. 2011 *Cisco IBSG*, 11 pages.

Extended European International Search Report issued in the European Patent Office in counterpart European Application No. 17161721.0, dated May 11, 2017, 10 pages.

\* cited by examiner

SYSTEM AND METHOD FOR PROVIDING DYNAMIC, ADAPTIVE AND COMPOSITE PRIVACY AND SECURITY FOR IOT COMMUNICATION

TECHNICAL FIELD

The present disclosure relates in general to Internet of Things (IoT) networks. More particularly, but not exclusively, the present disclosure discloses a method and system for dynamically adapting privacy and security for IoT communication.

BACKGROUND

The Internet of Things (IoT) refers to a network of physical objects/devices with internet connectivity, and the communication between such devices and other internet-enabled devices and systems. IoT aims to seamlessly connect the devices to the internet to capture, integrate, and process information using servers and computing devices located anywhere across the globe.

The connected devices may form their own IoT network, requiring communication within nodes in the IoT network, and to other IoT networks which may be different in nature (based on services, topology, communication protocols, connectivity, and the like) and may be located geographically far apart.

The privacy and security needs of the IoT networks, may be different under different circumstances depending on the interacting parties, context and purpose of communication. Further, to fulfill a certain purpose, the IoT communication could span several interactions and during such interactions, the privacy and security needs may change. Due to a change in the context, environment, mobility and the like one of the parties, encountering an exception, may increase/decrease in trust level of the partner involved in the communication.

As an example, in a wireless Body Area Network (BAN), the network may be acquiring and processing a large amount of information from user's body, some of which may be strictly private for the individual user, some of which may be private under specific scenarios and some of which may be public. Examples of highly private information may include biometric data such as heartbeat, pulse rate captured by the wearable devices, as well as medical history and health conditions of the user. Some of the user's information may be disclosed conditionally and/or selectively by the IoT network to external networks (IoT or otherwise) and applications, as an example to pre-authorized persons such as doctors, laboratories, insurance companies, and the like. Further, the extent of information sharing depends on factors such as the recipient of the information (such as user or machine, authorized or not authorized), context and purpose for which the information is being shared (emergency, health check), environment (e.g., public place, doctor's cabin), means of communication (e.g., IoT local protocols, protocols such as Wi Fi), and the like. In case of a health emergency, relevant information about the patient's critical parameters and medical history may be shared to a set of doctors without any detailed authentication/authorization procedure in a private and secured manner so that sensitive information does not fall into the wrong hands. However, biometric footprint, medical data, and the like should be shared in phases in a private and secured manner as the interaction progresses. So, the privacy and security aspects depend on the context, purpose and intent of the interacting IoT network(s).

The conventional techniques provide static security and privacy mechanisms. As an example, a patient who is travelling may exhibit emergency symptoms due to which all relevant data is shared to nearby hospitals, emergency centers, and the like. However, even if his/her condition improves, the data sharing levels remain the same, even though the patient may pass through some potentially vulnerable (to security hacks) areas. This causes potential breach of security/privacy and misuse of patient information.

Therefore, the issues with the static privacy and security mechanisms are that inadequate security and privacy due to change in context and/or purpose.

SUMMARY

The present disclosure relates to a method for dynamically adapting privacy and security for Internet of Things (IoT) communication. The method comprises handling, by an interconnect Gateway (ICG) of a Communicating Local Entity (CLE), a communication request received from a Communicating Remote Entity (CRE) by determining communication requirement, based on ICG communication-policy. Upon determining the communication requirement, the ICG and an IoTGW associated with the ICG at one end and the CLE at other end performs a pre-engagement communication between the CRE and the CLE for exchange of information. The ICG and the IoTGW maintains the pre-engagement communication during the exchange of information between the CRE and the CLE. Thereafter, the IoTGW and the ICG establishes an engagement communication between the CRE and the CLE. The IoTGW establishes the engagement communication when interest level during the exchange of information is greater than a pre-defined interest level. The ICG and the IoTGW maintains the engagement communication to identify one or more privacy and security related events during the exchange of communication and to identify one or more actions to handle the one or more privacy and security related events. Once the actions are undertaken or upon completion of the engagement communication, the ICG and the IoTGW terminates the engagement communication.

Further, the present disclosure relates to an ICG of a CLE for dynamically adapting privacy and security for IoT communication. The ICG comprises an IoT Gateway (IoTGW) interface communicably connected to an IoTGW associated with the ICG at one end and the CLE at another end, a Macro cellular and Core Network (MCN) interface communicably connected with a Communicating Remote Entity (CRE) for receiving a communication request from the CRE, an ICG memory configured to store information related to threshold and configuration settings, topology and connectivity information associated with IoT network and ICG local perception and ICG global perception, and an ICG Processor. The ICG processor comprises plurality of modules using which the ICG processor performs one or more operations. The ICG processor handles the communication request received from the CRE by determining communication requirement, based on ICG communication-policy. Thereafter, the ICG processor performs a pre-engagement communication between the CRE and the CLE for exchange of information upon determining the communication requirement. The ICG processor maintains the pre-engagement communication during the exchange of information between the CRE and the CUE and establishes an engagement communication between the CRE and the CLE. Further, the ICG processor maintains the engagement communication to identify one or more privacy and security related events during the exchange of communication and to identify one or more actions to handle the one or more privacy and security related events. Once the actions are undertaken or upon completion of the engagement communication, the ICU processor terminates the engagement communication.

Furthermore, the present disclosure relates to an IoTGW of a CLE for dynamically adapting privacy and security for IoT communication. The ICG comprises an IoT network (IoTN) interface communicably connected with the CRE, an IoTNext Interface communicably connected with the ICG to receive the communication request, IoTGW memory configured to store information related to threshold and configuration settings, topology and connectivity information associated with the IoT network and IOTGW local perception and IOTGW global perception, and a IoTGW processor. The IoTGW processor comprises one or more modules using which the IoTGW performs one or more operations. The IoTGW processor performs a pre-engagement communication between the CRE and the CLE for exchange of information upon receiving the communication request from the ICG. The IoTGW processor maintains the pre-engagement communication to monitor interest level. If the interest level during the exchange of information is greater than a predefined interest level, the IoTGW processor establishes an engagement communication between the CRE and the CLE. Further, the IoTGW processor maintains the engagement communication to identify one or more privacy and security related events during the exchange of communication and to identify one or more actions to handle the one or more privacy and security related events. Once the actions are undertaken or upon completion of the engagement communication, the IoTGW processor terminates the engagement communication.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and about the accompanying figures, in which.

Figure 1:
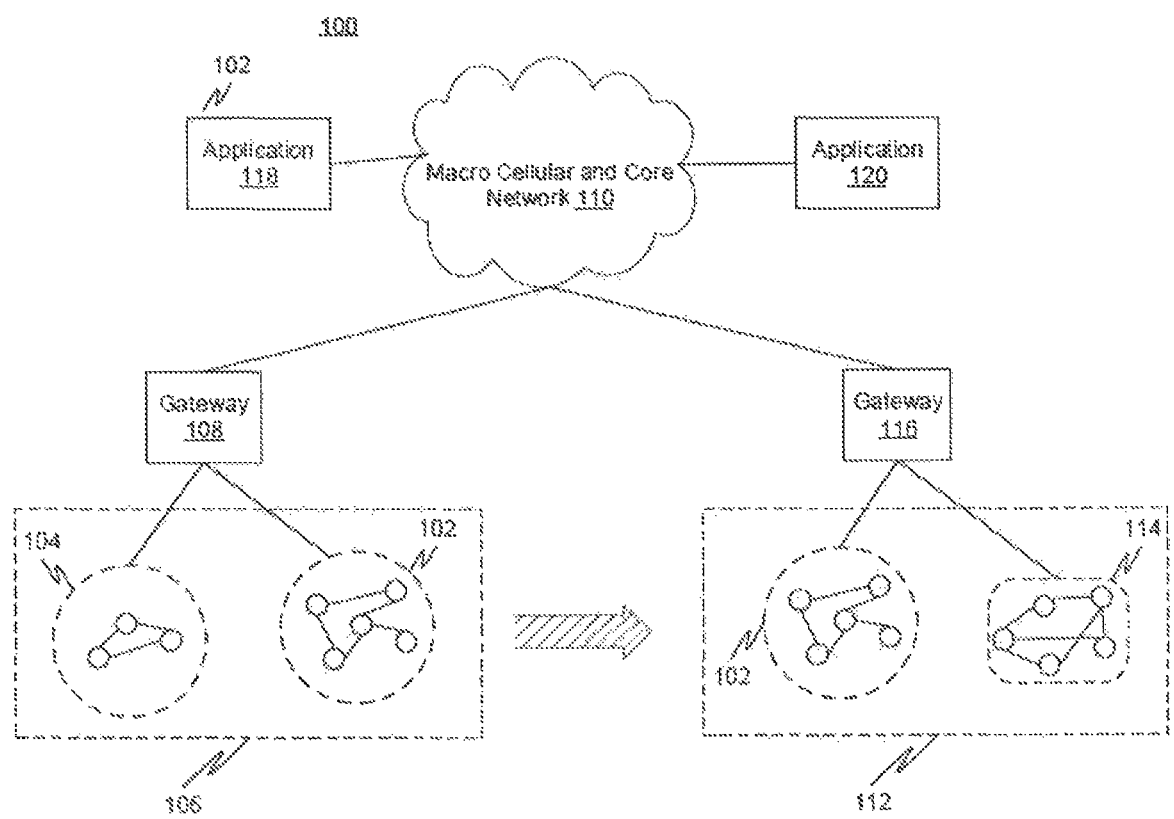
FIG. 1 illustrates an exemplary IoT environment illustrating method for dynamically adapting privacy and security in IoT communication in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary IoT environment illustrating a method for dynamically adapting privacy and security in IoT communication in accordance with some embodiments of the present disclosure.

The environment 100 includes a plurality of IoT device networks, such that each IoT device network is associated with an IoT subscriber. As an example, the plurality of IoT device networks may include a car IoT network 102 which is associated with owner of the car (in other words, an IoT subscriber) which may be moving from one point to another. The car IoT network 102 includes a plurality of car IoT devices. The plurality of IoT device networks may also include a home IoT network 104 associated with one or more owners of the house. The home IoT network 104 also includes a plurality of home IoT devices.

In an embodiment, the car IoT network 102 may be located at a location 106 which may be closer to home. For example, the car may be parked in a garage at the home. Thus, both the car IoT network 102 and the home IoT network 104 communicate with a gateway 108, which enables communication between the car IoT network 102 and the home IoT network 104. The gateway 108 may be an IoT Gateway (IoTGW). Alternatively, IoT device in each of the car IoT network 102 and the home IoT network 104 may directly communicate with a Macro cellular and Core Network (MCN) 110 without requiring the IoTGW 108.

Subsequently, the car may move from location 106, which is closer to home, to a location 112 that may be a gas station. The location 112 may include a gas station IoT network 114. Once the car is at location 112, the car IoT network 102 may communicate with the MCN 110 and the gas station IoT network 114 through a IoTGW 116. The gas station IoT network 114 may also communicate with the MCN 110 through the IoTGW 116. The MCN 110 further is in communication with a plurality of IoT applications, for example, an IoT application 118 and an IoT application 120.

The connectivity of different IoT networks facilitated through the IoTGW 108,116 and MCN 110 enables immediate resolution of any issue that is detected by the one or more IoT devices in any one of these IoT networks, for example, the car IoT network 102. For example, the car may have one or more issues which needs to be fixed either immediately or at a service station at a certain distance from the car. The issues detected by the car IoT network 102 may include, but are not limited to, impending collision with another vehicle, heated up engine, almost empty petrol tank, low air pressure in a tyre, non-critical service request, and reminder for periodic car maintenance service. In a similar manner, issues detected by the home IoT network 104 may include renewal of subscription for a channel in the in-house entertainment system, a gas leak, a fire alarm going off, and leakage of water.

Figure 2:
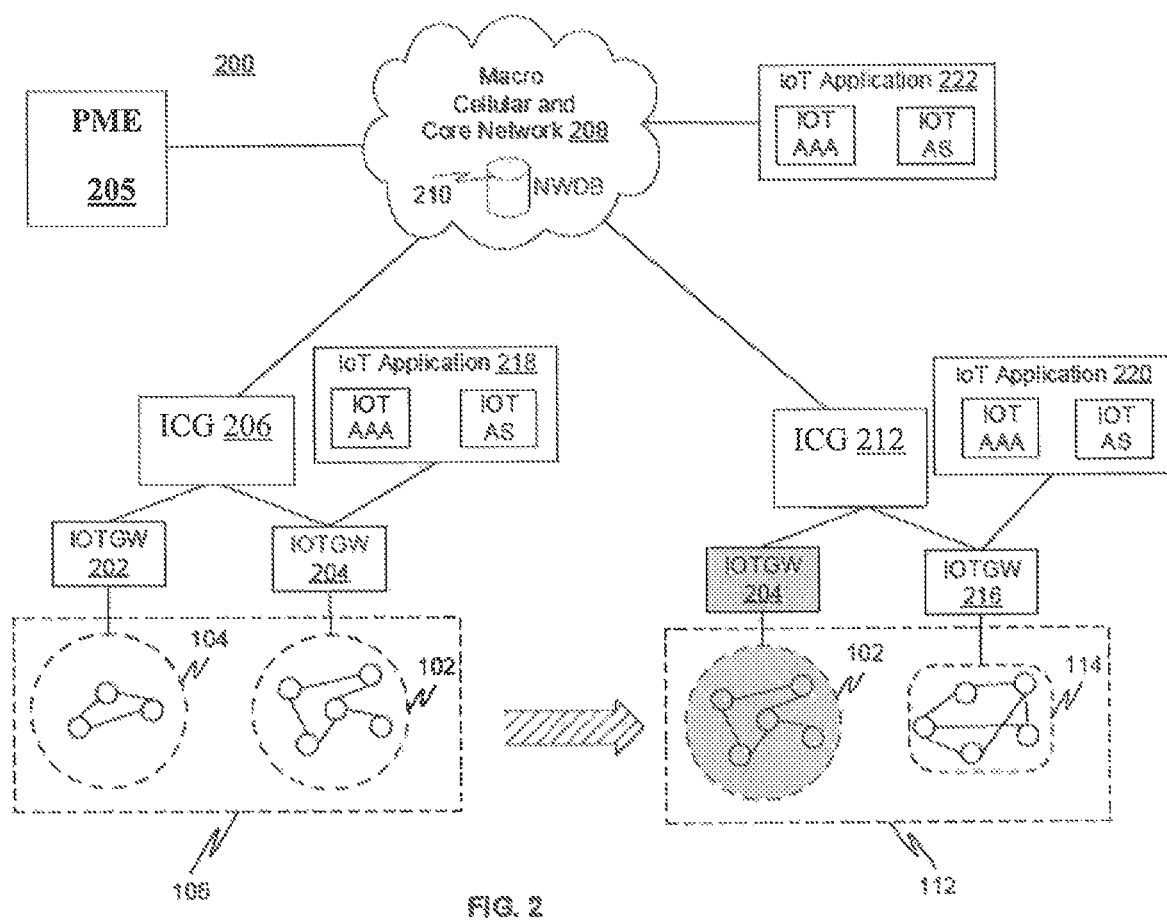
FIG. 2 illustrates network level interactions between various components of an IoT environment, in accordance with some embodiments of the present disclosure.

Referring now to FIG. 2, network level interactions between various components of an Internet of Things (IoT) system 200 is illustrated.

The IoT system 200 includes a plurality of IoT networks, i.e., the car IoT network 102, the home IoT network 104, and the gas station IoT network 114. At the location 106, the home IoT network 104 is communicatively coupled to an IoT Gateway (IoTGW) 202 and the car IoT network 102 is communicatively coupled to an IoTGW 204. The communication between the car IoT network 102 and the home IoT network 104 is facilitated through an Inter Connect Gateway (ICG) 206, which is communicatively coupled to each of IoTGW 202 and IoTGW 204. ICG 206 is also communicatively coupled to the MCN 208 that includes a Network Wide Database (NWDB) 210. NWDB 210 in one instance can be part of the MCN 208 or in another instance NWDB 210 can be associated with the MCN 208. The NWDB 210 may be a set of databases that is accessible by ICGs and IoTGWs in the IoT system 200. The NWDB 210 may include IoT network profile that includes information such as, but not limited to, device IDs, topology, home IoTGW, associated IoTGW, associated ICG, home ICG, encryption keys, and authentication vectors. NWDB 210 also stores relevant information about security-privacy settings used for previous engagements, e.g., encryption method.

When the car IoT network 102 moves from the location 106 to the location 112, the IoTGW 204 moves along with car IoT network 102 which remains communicatively coupled to IoTGW 204. However, at location 112, IoTGW 204 is communicatively coupled to an ICG 212. ICG 212 connects the IoTGW 204 with the MCN 208 and IoTGW 216, which is communicatively coupled to the gas station IoT network 114. ICG 212 thus enables communication of the car IoT network 102 With the MCN 208 and the gas station IoT network 114.

The IoT system 200 further includes one or more IoT Applications that are communicatively coupled to one of various components in IoT system 200. For example, an IoT application 218 is connected to the IoTGW 204 at location 106 and an IoT application 220 is connected to the IoTGW 216. By way of another example, an IoT application 222 is connected to the MCN 208. The IoT application may be of different types. In an embodiment, the IoT application may be one of an IoT Management Application (IoTMA) and an IoT Consumer Application (IoTCA). As the IoTGW 204 moves to location 112, it may still be directly connected to IoT Application 218, or it may be indirectly connected via ICG 212 or via the MCN 208.

The IoTMA may be distributed in the IoT network and may not necessarily be centrally located. The IoTMA primarily manages functions and policies of the IoT network and also provides thresholds for the IoTGWs. The threshold may be provided for one or more of, but not limited to, packet delays, packet drops, and signal strength for a particular IoT session. Upon receiving a communication request, the IoTMA may assess the need, reliability, security, criticality, priority, and purpose associated with the communication request, and the party/parties that may have capability to fulfill the need of the IoT network. Based on the reliability, priority, criticality, and security associated with a communication request, the IoTMA may also adapt the thresholds for an IoTGW.

The IoTCA makes use of the available data from one or more IoT networks in order to provide value-added services. The association between the IoTCA and the IoT network is typically temporary in nature.

The IoT system 200 also includes Perception Management Entity (PME) 205 which is associated with the MCN 208. The PME 205 may also be part of the MCN 208. The PME is 205 configured to provide ICG global perception, related to the CRE. The PME 205 gathers the ICG global perception from multiple ICUs, organizes and stores them, and prepares the collective perception based on the stored data. It provides the ICG global perception to the ICG 206 upon request, or when it is notified of an exception that occurred in the IoT network 102 or in any other IoT network (e.g., 104, 114). The PME 205 may be a part of the MCN 208 or can be an external entity that is reachable from the MCN 208.

In an exemplary embodiment, as the car IoT network 102 enters the gas station in the location 112, the car IoT device may have to register its presence by disclosing basic identity information. The gas station IoT network 114 could expose information about services offered by the gas station. Once the car IoT device decides to avail the services from the gas station, both the car IoT network 102 and the gas station IoT network 114 would disclose further information to fulfil the services. Such disclosure could involve authentication and authorization steps (for availing the service, payment), and several rounds of information-exchange and negotiations. In this scenario, it is evident that the disclosure should be based on need and purpose and hence should be controlled accordingly. For instance, the car-IoT network 102 could disclose information such as fuel level and car health if it wishes to obtain service from the gas station IoT network 114. Subsequently, it may provide owner details for authorization and payment. While leaving the gas station, the car-IoT device could interact with neighboring cars to obtain information about the road, traffic and other safety-related information without any detailed authentication/authorization steps to enable instantaneous exchange of relevant information. Further, if the Car-IoT network 102 develops a greater trust during the initial interactions with the gas station IoT network 114, it may decide to expose information about other needs and interest in value-added services which may be catered by the gas-station IoT network 114. Subsequently, during further interactions, if the Car-IoT network 102 determines that the environment is not secure or it receives external inputs that the experience with the gas station network 114 was not good, the Car-IoT network 102 may decide to limit its information exposure. Hence the privacy and security requirement, i.e., extent of information exposure and the manner in which the information is exchanged could change dynamically during an ongoing interaction. Therefore, the present disclosure, provides a mechanism which adapts the privacy and security levels dynamically by considering the context of communication, purpose of communication, past experiences during the communication and the interacting parties in the communication.

As an example, the car IoT device in the car IoT network 102 may receive a communication request from a gas station IoT device in the gas station IoT network 114 for communication i.e. to provide the service list for the car IoT device. For illustration, the car IoT device may be referred as the communicating local entity (CLE) and the car IoT network may be referred as the local IoT network. The gas station IoT device may be referred as the communicating remote entity (CRE) and the gas station IoT network may be referred as the remote IoT network.

Figure 3A:
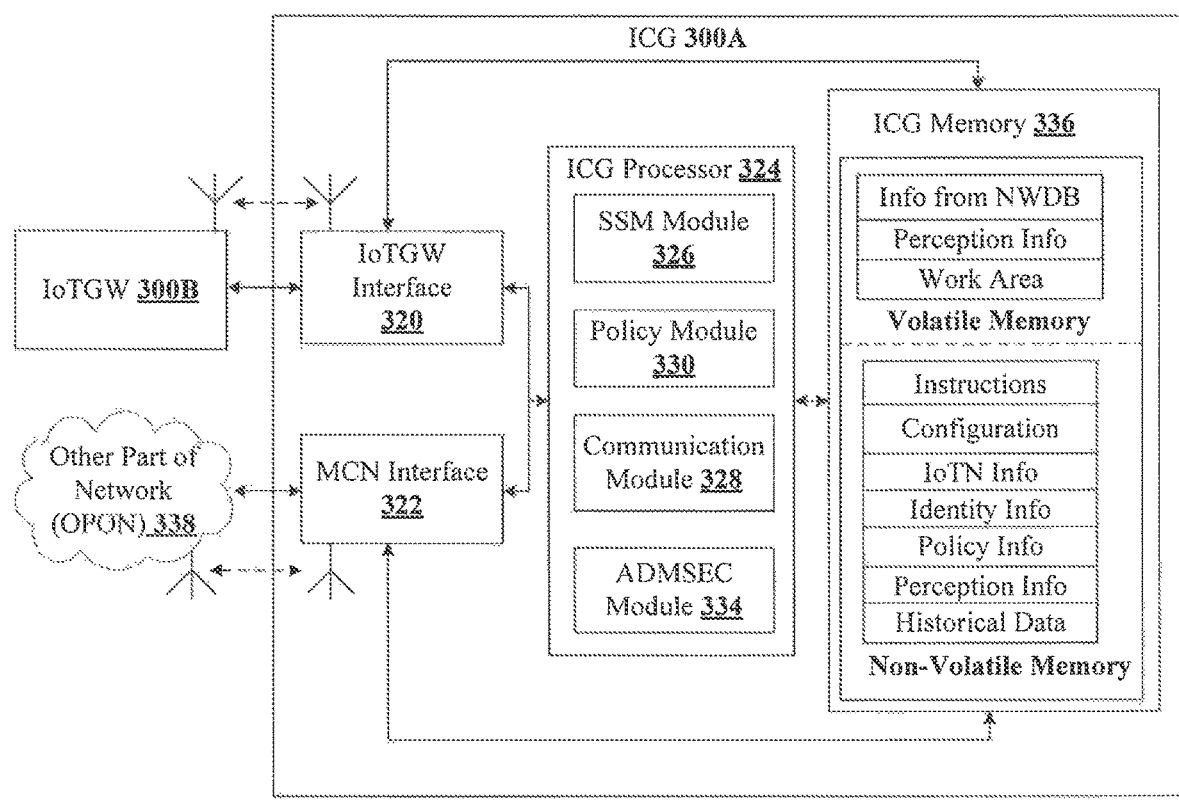
FIG. 3A is a block diagram illustrating various components and functionalities of an InterConnect Gateway (ICG), in accordance with some embodiments of the present disclosure.

In an embodiment, the ICG 206 receives the communication request from the CRE. FIG. 3A is a block diagram illustrating various components and functionalities of the ICG 300A in accordance with some embodiments of the present disclosure. The ICG 300A is analogous to ICG 206 disclosed in FIG. 2.

The ICG 300A may include an ICG processor 324, an ICG Memory 336, an IoTGW interface (IGI) 320 and an MCN Interface 322.

The IoTGW interface 320 enables communication of the ICG 300A with one or more associated IoTGW's (for example, IoTGW 300B). The mechanisms used by the IoTGW interface 320 may include, but are not limited to, connectivity over standard wireless interfaces such as Wi-Fi or Bluetooth, or some short range/line-of-sight interfaces like InfraRed (IR). A communication module 328 obtains the necessary information from the associated IoTGW 300B through the IoTGW interface 320 regarding the IoT network topology, status of IoT devices, and provides such information to other components in the ICG 300A. The IoTGW interface 320 also acts as an interface to the IoTGW 300B for control and signaling information exchange.

The Macro cellular and Core Network Interface (MCNI) 322 enables connectivity of the ICG 300A to Other part of the network 338 that may be connected to the CRE, one or more ICGs, IoTMAs, NWDB, Macro Cellular and Core network (MCN) 208, and the like. For example, the MCN 208 may be a 3G NodeB, 4G eNodeB, or a 5G RAN node. The various modes of connectivity used by the MCNI 322 to connect to Other part of the network 338 may include, but are not limited to, Wi-Fi Access Point (AP), a small cell's Home eNodeB (HeNB), a Cognitive Radio network's AP in case of opportunistic spectrum access. The communication module 328 is responsible for monitoring availability and status of heterogeneous connectivity modes (for example, 2G, 3G, 4G, 5G, WiFi, opportunistic interfaces such as Cognitive Radio) with other parts of the network 338 through the MCNI 322. The communication module 328 sends appropriate instructions to the 322, based on which, MCNI 322 establishes a communication channel/connection with MCN 208 and/or sends/receives IoT communication packets to/from the MCN 208. The MCNI 322 also acts as an interface to MCN 208 for control and signaling information exchange.

The IoTGW interface 320 and the MCNI 322 are communicatively connected to the ICG processor 324 and ICG memory 336. The ICG processor 324 includes plurality of modules. The plurality of modules is Session and Service Module (SSM) module 326, Policy Module (PM) 330, Communication module (COM) 328 and Administration and Security (ADMSEC) module 334. In an embodiment, the ICG processor 324 may be composed of more than 1 processor instances wherein each of the processor instances may be real (physical) processor instances or virtual processor instances, and each of the modules SSM module 326, Policy Module 330, Communication Module 328 and ADMSEC module 334 residing in different processors. In another embodiment, more than one of the modules SSM module 326, Policy Module 330, Communication Module 328 and ADMSEC module 334 may be residing in the same processor. The ICU processor 324 is also communicatively connected to the ICU memory 336.

The ICG memory 336 includes volatile memory and non-volatile memory. The volatile memory is configured to store information from the NWDB 210 and the information related to perception of the CRE. The information related to the perception of the CRE includes:

relevant portions of the most recent global perception obtained from a Perception Management Entity (PME) associated with the ICG 300A.

relevant portions of most recent local perception inputs either generated by the ICU 300A based on locally available ICG closing perception information, or obtained from one or more IoTGWs (e.g., IoTGW 300A) connected to the ICG 300A.

ICG-level perception(s) formed by the SSM 326 for ongoing pre-engagement(s) and engagement communication(s).

In an embodiment, the ICG-level perception contains attributes such as global identity (containing unique identity (UID), classification (ID-CLASS), identity details such as group id or individual id (ID-DET)) of the CRE, usual security level of the CRE (USU-SEC-LVL-CRE), usual privacy level of the CRE (USU-PRIV-LVL-CRE), need fulfillment track record at an aggregated level, i.e., not going into a functional or granular level as the IoTGW (AGGREG-NEED-FULFILL-REC-CRE), security compliance record (SEC-COMPL-REC-CRE) at an aggregated level (AGGREG-SEC-COMPL-REC-CRE), aggregated privacy compliance record (AGGREG-PRIV-COMPL-REC-CRE), and the like. These attributes in the ICG level perceptions may have relative values within a pre-specified range of values.

The non-volatile memory is configured to store one or more instructions for the ICG processor 324, operational configuration parameters, historical data, information related to ICG local perception and ICG global perception, policy information, identity information of the CRE and other entities with which a communication took place in the past, IoT network information and the like. The operational configuration parameters may include capabilities, thresholds, security settings, and the like. In addition, the configuration information related to privacy and security aspects (e.g., blacklisting certain CREs or certain purpose of communication based on policy) is also stored in the non-volatile memory. The thresholds and configuration settings related to security and privacy include ICG initial communication allowance threshold level (ICG-ALLOW-INIT-COMM-THR), ICU security and privacy threshold level (SEC-PRIV-THRESHOLD), and the like.

The ICG local perception is obtained from a database of the ICG 300A (local perception inputs are obtained from the ICG closing perception formed on completion of earlier engagements, or obtained from one or more IoTGWs (e.g., IoTGW 300B) connected to the ICG 300A if no local perception inputs are available locally) and the ICG global perception is obtained from the PME.

In an embodiment, the ICG processor 324 handles the communication request received from the CRE by determining communication requirement, based on ICG communication-policy. Thereafter, the ICG processor 324 performs a pre-engagement communication between the CRE and the CLE for exchange of information upon determining the communication requirement. The ICG processor 324 maintains the pre-engagement communication during the exchange of information between the CRE and the CLE and establishes an engagement communication between the CRE and the CLE when triggered by the IoTGW to do so. The ICG processor 324 maintains the engagement communication to identify one or more privacy and security related events (SEC-PR IV-EVENT) during the exchange of communication and to identify one or more actions to handle the one or more privacy and security related events. Once the actions are undertaken or upon completion of the engagement communication, the ICG processor 324 terminates the engagement communication.

In an embodiment, the SSM 326 forms ICG-level perceptions upon receiving the communication request until completion of the pre-engagement and the engagement communication. The SSM 326 analyses impact of the one or more privacy and security related events, forms pre-engagement session filter and ICG engagement filter and prepares a summary report of the communication between the CLE and the CRE, wherein the summary report includes information related to the identified one or more privacy and security related events and the one or more actions to handle the one or more privacy and security related events.

The SSM 326 forms the ICG-level perceptions by forming the pre-engagement perception (ICG-PRE-ENGP), engagement perception (ICG-ENGP) and the ICG closing perception/post engagement perception (ICG-POST-ENGP).

The pre-engagement perception (ICG-PRE-ENGP) is formed during the pre-engagement communication between the CLE and the CRE. ICG-PRE-ENGP is formed based on locally stored historical data (individual perception or local perception) about earlier engagements with the same or similar CREs, as well as inputs from the PME (global perception or collective perception).

The engagement perception (ICG-ENGP) is formed during the start of the engagement communication. The ICG-ENGP is formed based on the ICG-PRE-ENGP, information exchanged up to start of the engagement communication and context changes (observed at the ICU level, e.g., IoTGW mobility). The SSM 326 refines the ICG-ENGP during the engagement communication based on inputs from the PME, from the same ICG from other ongoing engagements or on reception of a SEC-PRIV-EVENT.

The post-engagement perception (ICG-POST-ENGP) is formed during termination of the engagement communication. ICG-POST-ENGP is based on the latest ICG-ENGP when the engagement communication was terminated, number of type of SEC-PRIV-EVENTs encountered, and the like. ICG-POST-ENGP is used as an input for determining the ICG-PRE-ENGP for future engagements.

Further, the SSM 326 analyzes the impact level of the SEC-PRIV-EVENT based on the ICG engagement perception, the ICG engagement session filter and previous history of engagement with the CRE or similar entities. ICG-SEC-PRIV-IMPACT-LVL could be a value over a fixed scale of say, 1 to 10. The SSM 326 also determines the threat level (ICU-SEC-PRIV-THREAT-LVL) of the SEC-PRIV-EVENT using a look-up table from a known list of exceptions, or assigned a default median value in case of unknown exceptions. ICG-SEC-PRIV-THREAT-LVL could be a value over a fixed scale of say, 1 to 5, with value 3 being assigned as default to unknown exceptions. The look-up table is stored in local database in the ICG 300A.

The SSM 326 also forms the ICG pre-engagement filter (ICG-PRE-ENG-FILT) and ICG engagement filter (ICG-ENG-FILT). The SSM 326 prepares a summary of the engagement from a security/privacy perspective including number and types of SEC-PRIV-EVENTs encountered, actions taken, etc. The SSM 326 updates historical database and forms a closing perception (ICG-POST-ENGP) when the engagement communication is terminated. ICG-POST-ENGP is used to determine ICG-PRE-ENGP for future engagements with the same CRE or similar entities and send relevant perception-related inputs to the PME based on own processed data as well as inputs received from the IoTGW 300B.

The PM 330 is configured to update security/privacy related policy aspects based on information received from the operator and the MCN 208.

The COM 328 is configured to perform operations which includes:
  determining allowance of the pre-engagement communication between the CLE and the CRE based on the pre-engagement perception
  obtaining the pre-engagement session filter and ICG engagement filter from the SSM 326 and apply the pre-engagement session filter and ICG engagement filter during the pre-engagement communication and the engagement communication respectively. Applying the pre-engagement session filter and ICG engagement filter implies that information received/sent which does not pass through the filter are dropped/discarded and/or appropriately modified (e.g., pseudo-anonymization) and violations are reported to the relevant entities (e.g., SSM 326 in the ICG 300A, PME 205, operator).
  providing information related to the privacy and security related events and information related to the perception information to the SSM 326; and
  performing the one or more actions upon receiving instruction from the SSM 326 in response to identifying the one or more privacy and security related events.

The ADMSEC module 334 is configured to perform operations which includes:
  obtaining the ICG global perception from the PME and providing the perception information to the IoTGW 300B upon receiving a request from the IoTGW 300B determining one or more actions to ensure security of communication channel between the CLE and the CRE and the communication content.

In an embodiment, when the ICG 300A determines the allowance of the pre-engagement communication between the CLE and the CRE, the ICG 300A transmits the communication request to the IoTGW 300E to determine the allowance of the pre-engagement communication.

Figure 3B:
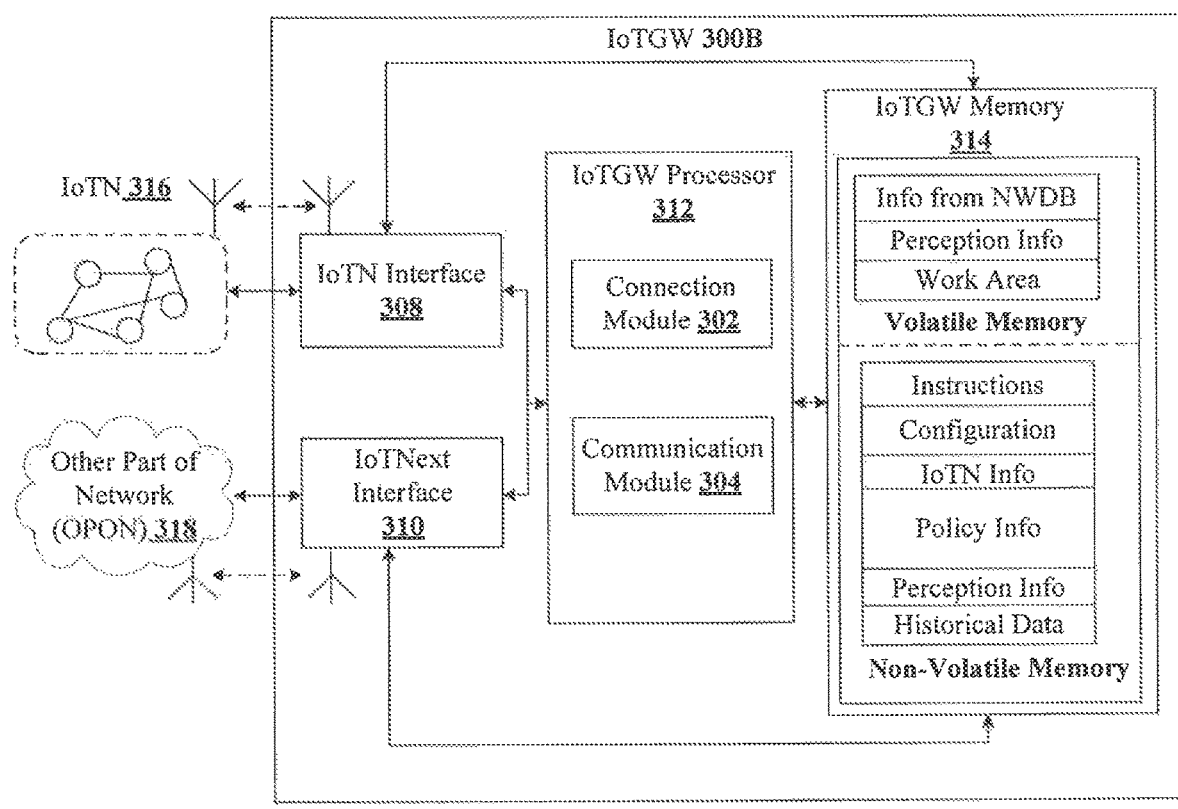
FIG. 3B is a block diagram illustrating various components and functionalities of an IoT Gateway (IoTGW), in accordance with some embodiments of the present disclosure.

FIG. 3B is a block diagram illustrating various components and functionalities of the IoTGW in accordance with some embodiments of the present disclosure.

IoTGW 300B is analogous to IoTGW 204 disclosed in FIG. 2. The IoTGW 300B includes an IoTGW Processor 312, an IoTGW Memory 314, an IoTN interface 308, and an IoTNext Interface 310. The IoTGW receives the communication request through the IoTNext interface 310 from the ICG 300A.

The IoTN interface 308 enables communication with an IoTN 316. The mechanism of communication used by the IoTN interface 308 may include, but is not limited to, standard interfaces, such as, Bluetooth, Wi-Fi, LORA, as well as any other proprietary mechanisms. The IoTNext interface 310 enables communication with other part of the network 318. Other part of the network 318 denotes the network segments in which ICG, IoTMA, NWDB, MCN, and the like are present. Mechanism of communication used by IoTNext interface 310 may include, but is not limited to, standard ones, such as, Wi-Fi, cellular (2G/3G/4G), as well as any proprietary mechanisms.

The IoTN interface and the IoTNext interface are communicatively connected to the IoTGW processor 312. The IoTGW processor 312 includes one or more modules such as a Connection Module (CONN-MOD) 302 and a Communication Module (CM-MOD) 304.

In an embodiment, the IoTGW Memory 314 includes a volatile memory as well as a non-volatile memory. The non-volatile memory may consist of one or more instructions for the IoTGW processor 312, operational configuration parameters, topology and connectivity information of the IoT network, information related to IoTGW local perception and IoTGW global perception and historical data. The operational configuration parameters may include capabilities, thresholds, security settings, and the like. In addition, the configuration related to privacy and security aspects (e.g., blacklisting certain CREs or certain purpose of communication based on policy) is also stored in the nonvolatile memory. The topology and connectivity information may include device details such as identity and location, authentication and authorization information of the CRE. The IoTGW global perception is received from the ICG 300A and IoTGW local perception information from the IoTMA. The historical data may include session durations, quality of connections, exceptions encountered, historical data related to security and privacy, e.g., closing perception of the CRE, and the like. The IoTGW-level perceptions may contain attributes such as assessed identity (AID-CRE) of the CRE, assessed exposure demanded (AED-CRE) by the CRE, existing security level of the CRE (SEC-LVL-CRE), existing privacy level of the CRE (PRIV-LVL-CRE), need fulfillment track record of the CRE (NEED-FULFILL-REC-CRE), security compliance record (SEC-COMPL-REC-CRE), privacy compliance record (PRIV-COMPL-REC-CRE), and the like. These attributes in the IoTGW-level perception may have relative values within a pre-specified range of values.

The volatile memory may include NWDB information consisting of IoTMA information, policy information, security information such as authentication vectors to be used and the like. The volatile memory may also include perception information which include relevant portions of the most recent IoTGW global perception received from the ICG 300A, relevant portions of the most recent IoTGW local perception generated/updated locally and/or updated based on information received from the IoTMA, and IoTGW-level perception(s) formed by the CM-MOD 304 for ongoing pre-engagement(s) and engagement(s) communication. The volatile memory may further include a work area containing condition and action tables, network and traffic condition information, communication channel information, privacy and security lifters, and the like.

In an embodiment, the IoTGW processor 312 receives the communication request from the ICG 300A. Upon receiving the communication request, the IoTGW performs a pre-engagement communication between the CRE and the CLE for exchange of information. The IoTGW processor 312 maintains the pre-engagement communication to monitor interest level during the exchange of information between the CRE and the CLE. When the interest level is greater than a predefined interest level, the IoTGW processor 312 establishes an engagement communication between the CRE and the CLE. The IoTGW processor 312 maintains the engagement communication to identify one or more privacy and security related events (SEC-PRIV-EVENT) during the exchange of communication and to identify one or more actions to handle the one or more privacy and security related events. Once the actions are undertaken or upon completion of the engagement communication, the IoTGW processor 312 terminates the engagement communication.

In an embodiment, the CM-MOD 304 forms IoTGW-level perception upon receiving the communication request until the pre-engagement communication or the engagement communication is terminated. The IoTGW-level perceptions are formed by:

forming initial perception upon receiving the communication request forming working perception during the pre-engagement communication with the CRE (and refining it during the pre-engagement communication), until beginning of the engagement communication forming IoTGW engagement perception at the start of the engagement communication with the CRE (and refining it during the engagement communication with the CRE), until the termination of the engagement communication forming IoTGW closing perception during termination of one of the pre-engagement communication or the engagement communication In an embodiment, the CM-MOD 304 may form the IoTGW-level perceptions by itself or may interact with the IoTMA to form the IoTGW-level perceptions.

The CM-MOD 304 determines the allowance of the pre-engagement communication based on the initial perception and any privacy and security related threats.

The CM-MOD 304 determines interest level of the CRE in the pre-engagement communication based on purpose and need of the communication with the CRE. The purpose and need for the communication is determined by the IoTMA. The CM-MOD 304 refines the interest level during the pre-engagement and the engagement communication. In an embodiment, the CM-MOD 304 forms initial session filter, intermediate session filter and IoTGW engagement filter and refines the intermediate session filter and IoTGW engagement filter.

The CM-MOD 304 analyses impact level of the one or more privacy and security related events during the engagement communication by determining impact level (IGW-SEC-PRIV-IMPACT-LVL), threat level (IGW-SEC-PRIV-THREAT-LVL) and a composite factor value IGW-SEC-PRIV-IMPACT-THREAT-LVL. The ICG-SEC-PRIV-IMPACT-LVL could be a value over a fixed scale of say, 1 to 10. The (IGW-SEC-PRIV-THREAT-LVL) may be determined using a look-up table from a known list of exceptions, or assigned a default median value in case of unknown exceptions, IGW-SEC-PRIV-THREAT-LVL could be a value over a fixed scale of say, 1 to 5, with value 3 being assigned as default to unknown exceptions.

The CM-MOD 304 prepares a summary of the engagement from a security/privacy perspective including number and types of SEC-PRIV-EVENTs encountered, actions taken, and the like The CM-MOD 304 updates historical database and forms a closing perception (IGW-CLOSING-PER) when the engagement communication is terminated. Also, the CM-MOD 304 transmits relevant perception-related inputs to the ICG 300A which then uses it to send relevant information to the PME 205. Further, the CM-MOD 304 obtains collective perception-related information from the ICG 300A (which in turn, obtains it from the PME 205) before forming the IGW-INIT-PER.

In an embodiment, the connection module 302 applies the intermediate session filter and the IoTGW engagement filter during the pre-engagement communication and the engagement communication respectively, reports the one or more privacy and security related events to the SSM 326 and performs one or more actions on the identified one or more privacy and security related events upon receiving an instruction from the SSM 326.

In an embodiment, the IOTMA is configured to:
determine purpose of the communication and the need for the communication with the CRE during the pre-engagement communication,
update the purpose and the need during the pre-engagement communication and during the engagement communication with the CRE
determine and update extent of need fulfilment (EXT-NEED-FULFILL) prior to the engagement communication and during the engagement communication based on the purpose and need,
provide inputs and thresholds to the IoTGW 300B to determine interest level for the communication with the CRE, the filters to be used before and during the engagement communication. The inputs and thresholds may include:
Exceptions for privacy and security compliance
IoTGW-INIT-COMM-ALLOW-RULES-THR: Used to check allowance of pre-engagement communication
NF-THR: Need fulfillment thresholds
NEED-THR: Need thresholds used when determining the need
PRE-ENG-INT-THR and ENG-INT-THR: Pre-engagement and engagement interest thresholds used to determine whether to continue pre-engagement or engagement communication respectively
SL-THR and PL-THR: Security level and privacy level thresholds
SFRAT: Specific filter rules and thresholds used to form the session filters (pre-engagement and engagement filters)
SEC-PRIV-THRESHOLD: Used to determine the next steps when a privacy-security exception event occurs during the engagement communication.
SPC-THR: Security privacy compliance thresholds consolidate information, received from the IoTGW 300B at termination of the engagement communication, related to the IOTGW local perception. The IOTMA also updates the local perception and stores it. Such updates may include, but not limited to, updating the capability, security and privacy track record.
facilitate the IoTGW 300B to form perceptions and to analyze impact of the one or more privacy and security related events.

In an embodiment, the IoTMA, executes the actions listed below (alternatively referred as First Method) to determine/update the functional purpose of the communication request.
First Method:
Map received message type and any additional relevant information that was received from the IoTGW 300B (e.g., additional details of the communication request which could influence the purpose) with standard need for communication
Look up for any such past exchange with the CRE or similar parties (historical DB)
In case no record found or the local copy of global information is stale (based on checking the time stamp when the information was last updated), obtain global information from the IoTGW 300B (IoTGW receives this information from the ICG 300A).
Using information of past exchanges with the CRE, and additional information that was provided by the IoTGW 300B about the CRE (e.g., information that augmented or contradicted earlier information), identify functional purpose type
Determine reliability/confidence score based on past exceptions (local and global) and relevant exceptions encountered in current communication session.

In an embodiment, the IoTMA executes the actions hated below (Alternatively referred as Second Method) to determine the need for the communication and the need-fulfillment-thresholds.
Second Method:
IoTMA identifies the need for communication by matching determined purpose with the existing list of needs from IoTMA's own memory along with the extent of the need (need-thresholds),
The IoTMA then determines the need-fulfilment-thresholds (fulfilment condition) (NF-THR) by comparing the ability of the CRE to fulfill the need (NFA) with the need-thresholds (NEED-THR). IoTMA determines NFA by considering the need fulfillment track record of the CRE and relevant information exchanged during the communication.

In an embodiment, the IoTGW executes the actions listed below (Alternatively referred as third Method) to determine the interest level for the communication. When this Method is executed, IoTGW-LVL-PER which refers to the IoTGW-level perception is provided as input, IoTGW-LVL-PER can be the most recent working perception or most recent IoTGW engagement perception depending on whether the communication with the CRE is in pre-engagement communication phase or engagement communication phase.
Third Method:
The CM-MOD 304 checks for usability of locally available IoTMA-REL-LOCAL-PER information, e.g., by comparing the timestamp, and whether the assessed CRE ID and CRT has undergone a change after the last time the REL-LOCAL-PER information was updated. In case the IoTMA-REL-LOCAL-PER information stored locally is stale, the CM-MOD 304 obtains IoTMA-REL-LOCAL-PER about the CRE from the IoTMA.

The CM-MOD 304 determines CRE-capability (CRE-CAPAB) by combining relevant information from the IoTMA-REL-LOCAL-PER about the CRE with the CRE-Proof of identity (CRE-ID-PROOF).

The CM-MOD 304 determines if the CRE has capability of serving the determined purpose by comparing the relevant attributes in the CRE-CAPAB with the determined purpose.

The CM-MOD 304 estimates the need-fulfillment-confidence-level (NFCL) of the CRE, by comparing need fulfillment track record from the CRE-capability with the need-fulfillment thresholds (NF-THR), NFCL index is estimated by using simple weighted average, standard-deviation, polynomial based estimation, etc.

The CM-MOD 304 checks if the NFCL is above the accepted level of NFCL (ACCEPT-NFCL-THR) obtained from the IoTMA. If it is so, then CM-MOD 304 checks whether the security compliance and privacy compliance records of the CRE for the determined purpose from the IoTGW-LVL-PER are above the SPC-THR (obtained from the IoTMA).

In case the security compliance and privacy compliance records of the CRE for the determined purpose from the IoTGW-LVL-PER are above the SPC-THR, the CM-MOD 304 then checks if the exposure-demand can be provided by comparing the determined-exposure-demand with determined-purpose and IoTGW-LVL-PER (privacy & security compliance record).

The CM-MOD 304 then determines the interest level of communication (INT-LEVEL) as a weighted average or some other combination of NFCL and security and privacy attributes (track record and current levels) in the IoTGW-LVL-PER.

Figure 4:
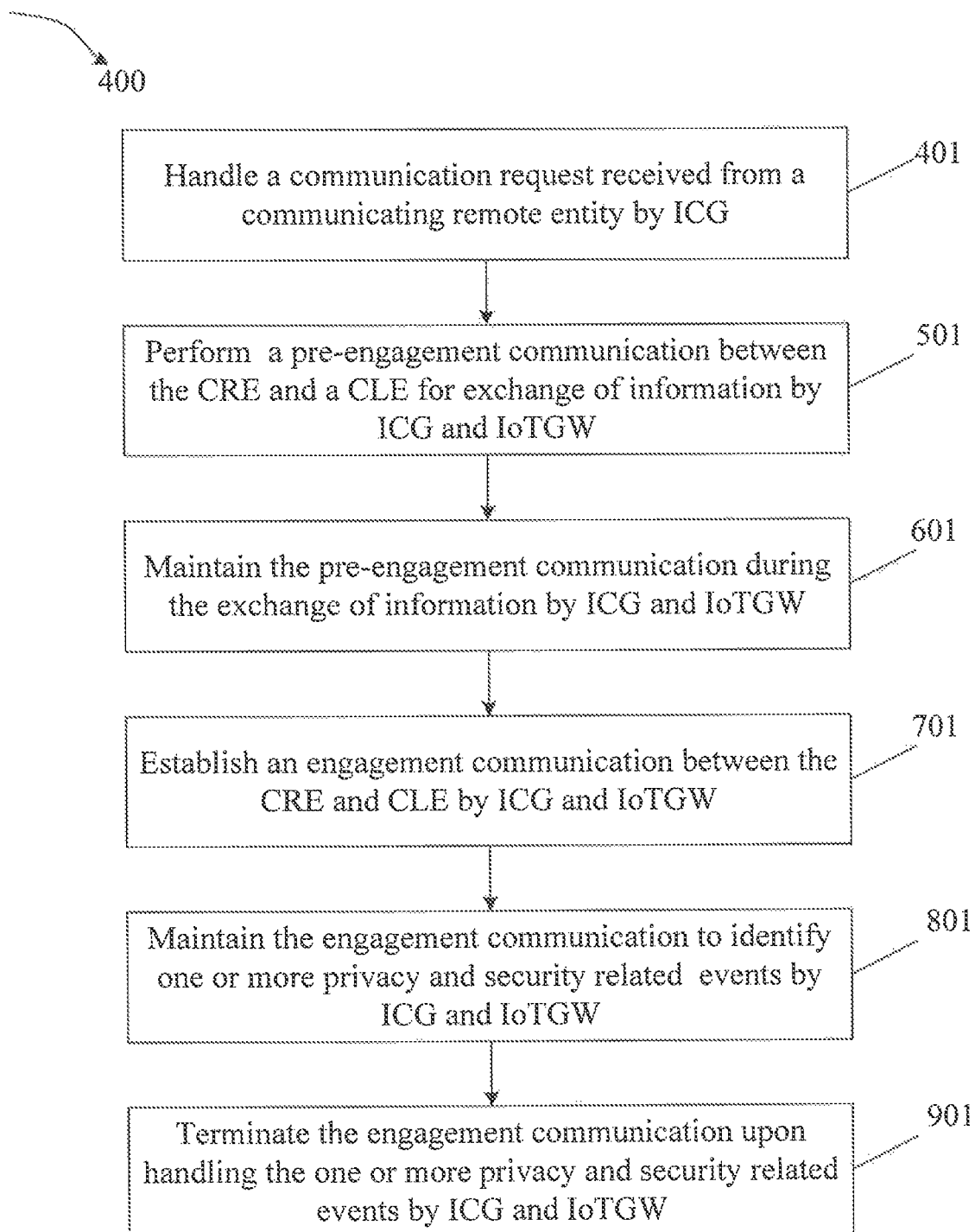
FIGS. 4-10 shows flowchart illustrating a method for dynamically adapting privacy and security in IoT communication in accordance with some embodiments of the present disclosure.

FIG. 4 shows a flowchart illustrating a method for dynamically adapting privacy and security in IoT communication.

As illustrated in FIG. 4, the method comprises one or more blocks for dynamically adapting privacy and security in IoT communication. The method may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

The method below illustrates the steps for a communication request which is received from an external entity which may be another IoT network [gas station IoT network] or a third-party application. The below steps may also be applied with suitable adaptations for the communication request originating from the IoT network [car IoT network] to the external entity. For illustration, the method below considers the communication request being received from a communicating remote entity (CRE) (external entity). The CRE is an IoT device from a remote IoT network. [for example gas station IoT network]. The ICG 300A which receives the communication request is associated with an IoTGW 300B.

The IoTGW 300B is associated with a communicating local entity (CLE) to which the communication from the CRE was intended. The CLE can be a specific IoT device from a the local IoT network [for example car IoT network] or any device in the local IoT network.

At block 401, the ICG 300A of the CLE handles a communication request received from the CRE by determining communication requirement, based on ICG 300A communication-policy. The ICG 300A handles the communication request by executing steps as illustrated in the FIG. 5 at blocks 403, 405.

Figure 5:
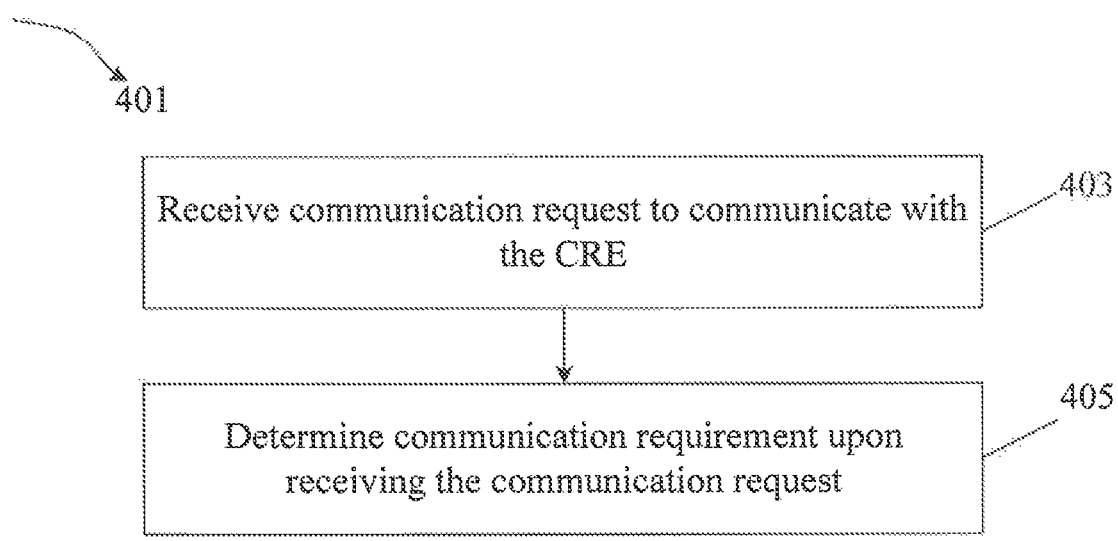

Referring to FIG. 5, at block 403, the ICG 300A receives the communication request. The MCNI 322 in the ICG 300A receives the communication request to communicate with a CRE for which the ICG 300A has most recently handled the external communication request. The MCNI 322 passes the request to the SSM 326 in the ICG 300A.

At block 405, the ICG 300A determines the communication requirement. The SSM 326 checks with the ADMSEC module 334 for any privacy and security restriction for the communication request, e.g., a blacklisted user, a forbidden (by network/regulatory policy) communication request type (e.g., one that does not contain any traceable identification of the originator, i.e., completely anonymous), and the like. In case of any such restriction, the SSM 326 rejects the communication request and updates its associated local database. Thereafter, the SSM 326 checks for the existence of an active session between the source of the communication request and the destination IoT-network/IoT-device. If the active session exists then the process of performing an initial communication (alternatively referred as pre-engagement communication) between the CLE and the CRE is initiated. If the active session does not exist, then the ICU 300A determines the connectivity status.

The IGI 320 in the ICG 300A ascertains the reachability of the IoTGW associated with the CLE using multicast/broadcast mechanisms and registers by checking the registration status in its local database. Three scenarios may be possible as mentioned below:

Case (a)—IoTGW is not reachable: In this case, the IGI 320 triggers an IoTGW discovery and registration process using one or more predefined techniques.

Case (b)—IoTGW is reachable but not registered: In this case, the IGI 320 triggers the IoTGW registration process.

Case (c)—IoTGW is reachable and registered: In this case, the IGI 320 simply triggers further actions as mentioned below.

Upon ensuring successful registration of the IoTGW, the IGI 320 sends instruction to the IoTGW to determine connectivity and registration status of IoT network of the CRE.

In an embodiment, once the connectivity aspects are completed, and a connection to the IoTGW and IoT network are checked and established, the actions of performing the pre-engagement communication is initiated.

Referring back to FIG. 4, at block 501, the ICG 300A and the IoTGW 300B performs pre-engagement communication between the CRE and the CLE for exchange of information upon determining the communication requirement.

Figure 6:
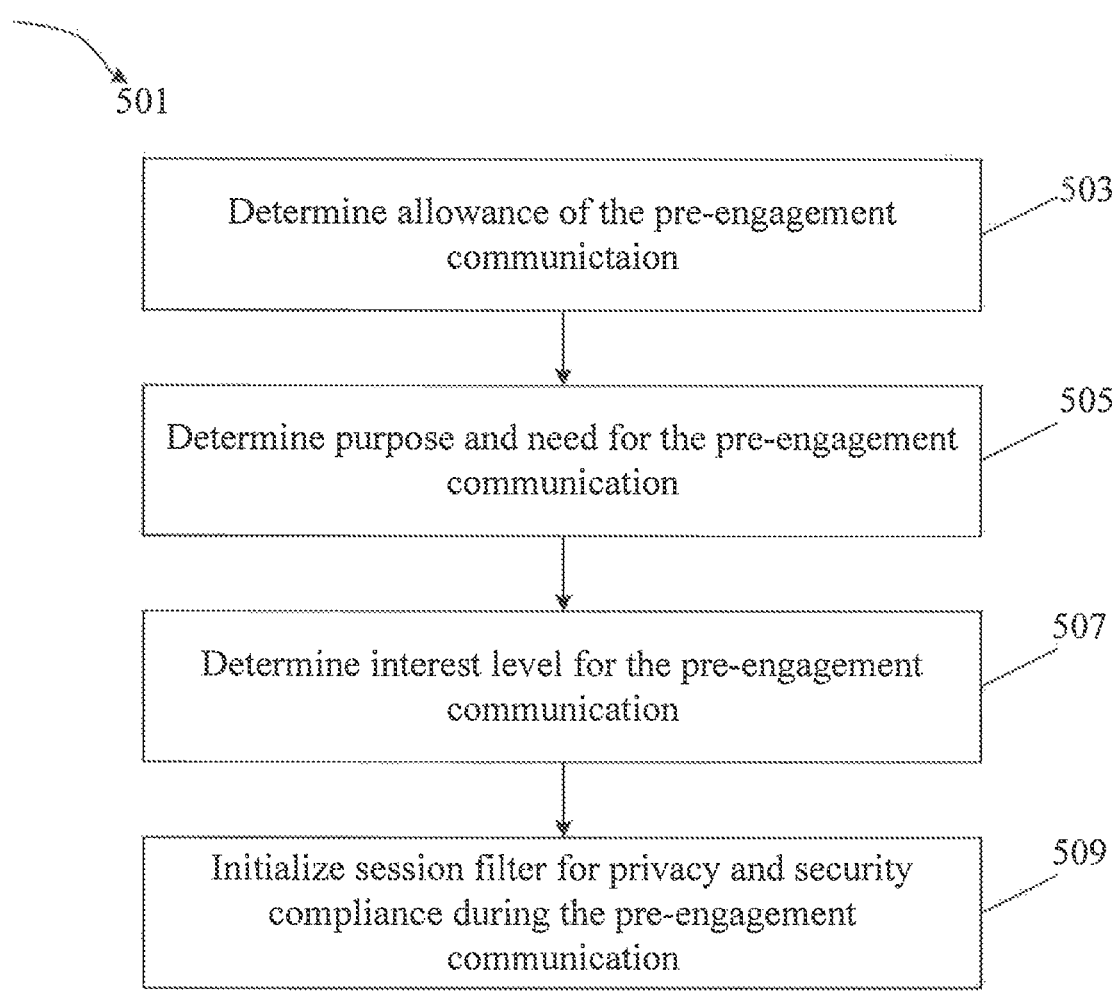

The ICG 300A and the IoTGW 300B performs the pre-engagement communication by performing the steps as illustrated in FIG. 6 at blocks 503, 505, 507 and 509.

Referring to FIG. 6, At block 503, the ICG 300A and IoTGW 300B, determines allowance of the pre-engagement communication.

At first, the ICG 300A determines the allowance of the pre-engagement communication between the CLE and the CRE. In an embodiment, the ICG 300A forms pre-engagement perception for the CRE based on ICG local perception and ICG global perception corresponding to identity information of the CRE. The SSM 326 of ICG 300A obtains the CRE identity information from the initial communication request.

The SSM 326 checks the availability and usability of global perception data (GLOB-PERCEPT-INF) stored in its non-volatile memory e.g., by checking the time stamp of last update. In case the locally stored GLOB-PERCEPT-INF is stale, the SSM 326 obtains GLOB-PERCEPT-INF front the PME by sending a request to the PME along with CRE identity information. If any data/information in memory ages more than a pre-specified duration, then that information can be automatically marked as stale. The system may also mark some data/information stale by force even before aging beyond the pre-specified duration in case of specific exceptions/events, in case the PME does not have any GLOB-PERCEPT-INF (for the CRE or otherwise), it sends GLOB-PERCEPT-INF with default values (the default perception may be generic or be different depending on classification of the CRE). The SSM 326 then extracts relevant portions of the GLOB-PERCEPT-INF to form the ICG global perception (ICG-REL-GLOBAL-PER) (e.g., taking the parts relevant to the CRE identity or taking the parts relevant to the set of parties similar to the CRE, and the like).

The SSM 326 forms the ICG local perception (ICG-REL-LOCAL-PER) for the CRE as follows: At first, the SSM 326 checks the availability and usability of ICG-LOCAL-PERCEPT-INF stored in its non-volatile memory e.g., by checking the time stamp of last update. In case ICG-LOCAL-PERCEPT-INF information is stale, the SSM 326 obtains relevant data from the IoTGW 300B involved in the session or any other IoTGW that is in communication with the CRE to update the ICG-LOCAL-PERCEPT-INF. The SSM 326 then forms the ICG local perception (ICG-REL-LOCAL-PER) by taking relevant information from ICG-LOCAL-PERCEPT-INF (e.g., attributes relevant to the CRE, present location of CRE, and the like).

The SSM 326 then forms ICG-level pre-engagement perception (ICG-PRE-ENGP) by combining ICG-REL-GLOBAL-PER and ICG-REL-LOCAL-PER by comparing perception attributes in these two parameters, and the corresponding timestamp and relative relevance (e.g., weightage), and the like. In an embodiment, the pre-engagement perception (ICG-PRE-ENGP) is associated with a privacy and security compliance level. The COM 328 in the ICG 300A checks for the allowance of the pre-engagement communication by comparing the privacy and the security compliance level of the ICG-PRE-ENGP with predefined ICG initial communication allowance threshold level (ICG-ALLOW-INIT-COMM-THR). Upon determining that the initial communication is allowed (i.e., the security and privacy compliance level of ICG-PRE-ENGP is greater than the ICG-ALLOW-INIT-COMM-THR), the COM 328 provides a positive feedback to the SSM 326 on allowance of the pre-engagement communication and transmits the communication request to the IoTGW 300B to check for allowance of initial communication and proceed further.

In an embodiment, the SSM 326 forms a pre-engagement filter (ICG-PRE-ENG-FILT) based on the ICG-PRE-ENGP using Global-Filter-rules-and-threshold (GFRAT). The SSM 326 first checks whether the GFRAT is stale based on time stamp of last update, etc. In case the GFRAT information is stale, the SSM 326 obtains the latest GFRAT from the PME 205. The SSM 326 uses the GFRAT information and associates the rules and thresholds with the ICG-PRE-ENGP information to form CRE-specific rules and thresholds (CRE-SRT) (to be used for the current communication session). The SSM 326 constructs the ICG-PRE-ENG-FILT using the determined CRE-SRT for communication. The SSM 326 then provides the ICG-PRE-ENG-FILT to the COM 328.

Later, the IoTGW 300B determines the allowance of the pre-engagement communication between the CLE and the CRE.

The communication module (CM-MOD) 304 in the IoTGW 300B forms initial perception for the CRE upon receipt of the communication request based on the IoTGW local and global perception.

The CM-MOD 304 extracts information about the CRE and the nature/type of communication request (CRT). The CM-MOD 304 assesses the identity of the CRE, and obtains proof of identity from local, IoTMA or other third-party sources using mechanisms such as digital certificates, and the like. The CM-MOD 304 fetches relevant portion of the IoTGW global perception (REL-GLOB-PER) from the non-volatile memory based on the CRE-identity (CRE-ID) and initial communication request type (CRT). The CM-MOD 304 checks whether the information is usable (based on time-stamp, and the like.). In case the information is not usable, the CM-MOD 304 requests and obtains the updated IoTGW global perception from the ICU 300A (which may provide it from local database or fetch it from PME 205).

Further, the CM-MOD 304 fetches relevant portion of the local perception (IoTMA-REL-LOCAL-PER) from the non-volatile memory based on the CRE ID and initial CRT. The CM-MOD 304 checks whether the IoTMA-REL-LOCAL-PER is usable (based on time-stamp, and the like.). In case the information is not usable, the CM-MOD 304 obtains the updated IoTGW local perception (REL-LOCAL-PER) information from the IoTMA.

The CM-MOD 304 then forms IGW-INIT-PER by combining the REL-GLOBAL-PER and REL-LOCAL-PER and by comparing perception attributes and the corresponding timestamp and relative relevance (e.g., weightage) and the like. The IGW-INIT-PER is associated with a communication allowance level.

In an embodiment, the CM-MOD 304 in the IoTGW 300B then determines the allowance of the communication request based on the IGW-INIT-PER, the current IoT network location, and the like and checking it against pre-defined IOTGW initial communication allowance threshold level (IoTGW-INIT-COMM-ALLOW-RULES-THR). In case the communication request is not allowed, the CM-MOD 304 in the IoTGW 300B informs the ICG 300A and updates the local database and the communication request is rejected. If in case the communication request is allowed, then the further actions are initiated which are as described in the below description.

At block 505, the IoT Management application associated with the IoTGW 300B determines purpose and need for the pre-engagement communication.

In an embodiment, once the IoTGW 300B determines the allowance of the communication request, the IoTGW 300B transmits a request to the IoTMA for determination of need and purpose of communication along with relevant portion of the pre-engagement communication. The relevant portion of the pre-engagement communication contains information on the functional aspects such as message type, request/service details, and the like.

The IoTMA determines the purpose for the pre-engagement communication based on contents of the communication request, data associated with previous communication of the CRE with the CLE, one or more exceptions encountered during the previous communication. The IoTMA determines the need for the pre-engagement communication by matching the determined purpose with need threshold value. Thereafter, the IoTMA determines need-fulfilment threshold (NF-THR) by comparing ability of the CRE to fulfil the need (NFA) with the need threshold value. The NFA is determined based on need-fulfilment track record (NFTR) of the CRE and information exchanged during the pre-engagement communication.

In an embodiment, the CM-MOD 304 in the IoTGW 300B receives the determined purpose and need for communication from the IoTMA along with the NF-THR.

At block 507, the IoTGW 300B, determines interest level for the pre-engagement communication. The CM-MOD 304 in the IoTGW 300B determines the interest level (INT-LEVEL) of the associated IoT network by combining the purpose, need of communication, need-fulfilment-thresholds and one or more first security and privacy attributes in the initial perception.

In an embodiment, if the CM-MOD 304 determines that the CRE is interested to communicate, and the determined INT-LEVEL is greater than pre-engagement interest threshold (PRE-ENG-INT-THR) then the CM-MOD 304 continues with the pre-engagement communication. If the INT-LEVEL is less than the PRE-ENG-INT-THR the CM-MOD 304 terminates the pre-engagement communication by sending a negative response, informing the ICG 300A and updating its local database with relevant information.

At block 509, the ICG 300A and IoTGW 300B initializes session filter for privacy and security compliance during the pre-engagement communication.

The CM-MOD 304 in the IoTGW 300B forms a working perception (IGW-WORK-PER) based on the IGW-INIT-PER by assessing the privacy and the security compliance level of an environment of the pre-engagement communication. The CM-MOD 304 assess level of security of the environment during the pre-engagement communication, assess level of privacy of the environment during the pre-engagement communication, assess exposure demanded by the CRE for the communication during the pre-engagement communication. The CM-MOD 304 compares the assessed security level (ASL) and assessed privacy level (APL) against existing thresholds (SL-THR and PR-THR).

Further, the CM-MOD 304 forms the IGW-WORK-PER by adjusting relevant attributes of IGW-INIT-PER. Such adjustment could include updating the IGW-INIT-PER with most recent values, adding further details, adjusting the weightages, and the like. The attributes adjusted could include assessed exposure demanded by the CRE, security level, privacy level, and the like. The CM MOD 304 also forms the initial session filter (IGW-INIT-SESS-FILT) based on the IGW-WORK-PER as described below:

At first, the CM-MOD 304 checks whether the GFRAT is stale based on time-stamp and the like. In case the GFRFAT information is stale, the IoTGW 300B obtains the latest GRFAT from the ICG 300A. The CM-MOD 304 then obtains specific adaptations to the filter rules and thresholds from the IoTMA (e.g., rules based on the CRE identity, purpose, location, etc.) (SFRAT).

Later, the CM-MOD 304 uses GFRAT and associates the rules and thresholds with the IoTGW-WORK-PER to form CRE-specific rules and thresholds. These rules and thresholds are adapted based on SFRAT which was obtained from the IoTMA.

Finally, the CM-MOD 304 constructs the IoTGW-INIT-SESS-FILT for the communication session using the determined CRE-specific rules and thresholds for the communication and passes the determined IoTGW-INIT-SESS-FILT to the CONN-MOD 302. The CM-MOD 304 initializes an intermediate session filter (IGW-INTERIM-SESS-FILT) with the value in IGW-INIT-SESS-FILT.

In an embodiment, the ICG 300A forms a pre-engagement session filter using specific rules and thresholds (SRT) of the CRE, wherein the SRT is formed by associating rules and thresholds in global filter rules and thresholds (GFRAT) with the pre-engagement perception. The GFRAT is obtained from the PME 205.

Once the session filters are formed, the CM-MOD 304 in the IoTGW and the COM 328 in the ICG 300A configure communication channel (PRE-ENG-COM-CHL) to be used for the pre-engagement communication, and apply those filters on any information exchanged between the CLE and the CRE. This communication channel may then be used for further pre-engagement communication with the CRE. The communication contents sent by the IoTGW 300B which has to be sent to the CRE is then transmitted over the PRE-ENG-COM-CHL by the MCNI 322 in the ICG 300A. Therefore, the initial communication or pre-engagement communication between the IoT network/IoTGW and the CRE is initiated.

Referring back to FIG. 4, at block 601, the ICG 300A and IoTGW 300B maintains the pre-engagement communication during the exchange of information between the CRE and the CLE.

Figure 7:
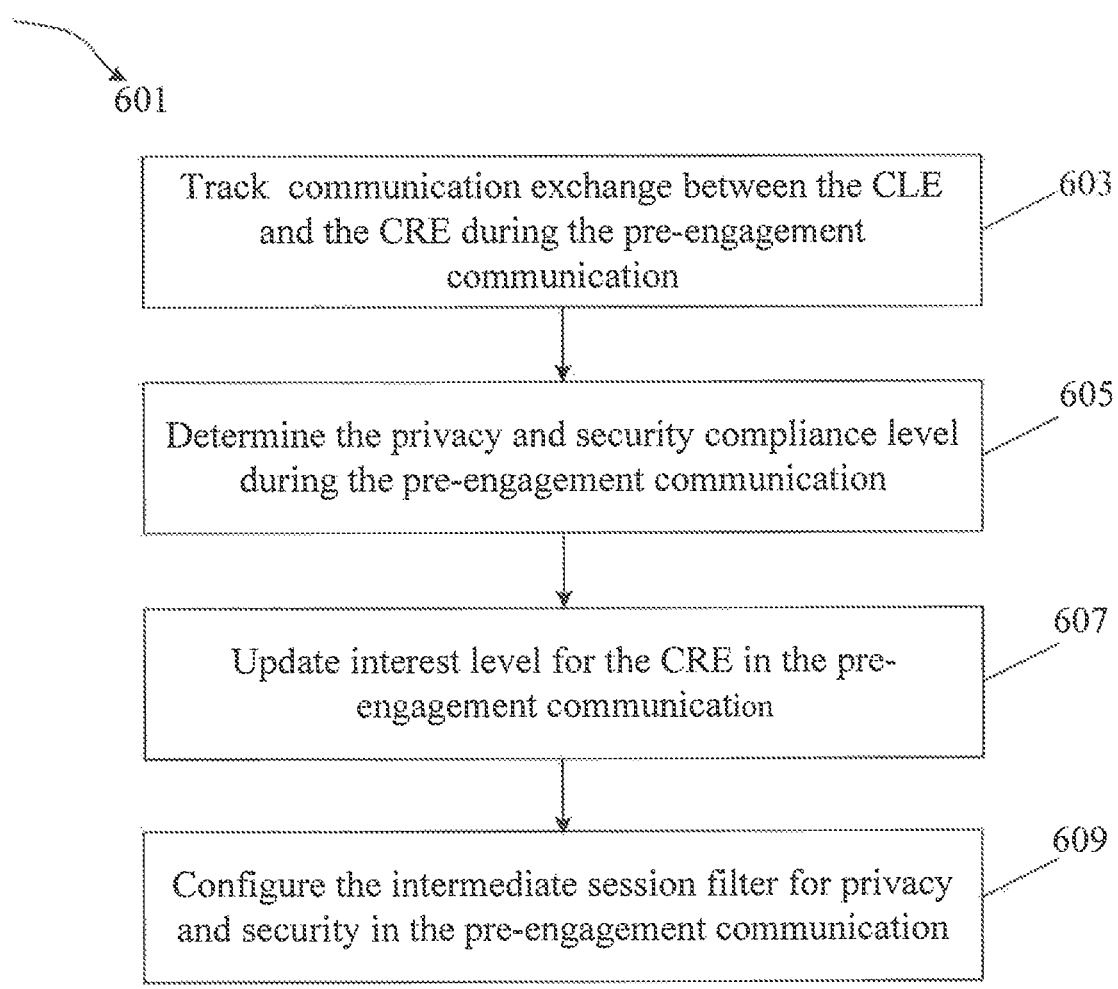

The ICG 300A and IoTGW 300B maintains the pre-engagement communication by performing the steps as illustrated in FIG. 7 at blocks 603, 605, 607.

Referring to FIG. 7, at block 603, the ICG 300A and IoTGW 300B, track communication exchange between the CLE and the CRE during the pre-engagement communication. The CONN-MOD 302 in the IoTGW 300B passes the communication contents through the IGW-INTERIM-SESS-FILT before sending/processing it further and the ICG 300A passes all the communication contents through the ICG-PRE-ENG-FILT before sending/processing it further.

At block 605, the IoTGW 300B determines the privacy and security compliance level during the pre-engagement communication.

During the interaction with the CRE, the CM-MOD 304 in the IoTGW 300B provides details of information exchange with the CRE until that point of time (including information content, timeouts for requests sent by the IoTN/IoTGW, lack of proper responses, and the like.) to the IoTMA either periodically or upon receipt of additional information from the CRE. Based on this, the IoTMA makes necessary updates to the purpose of the communication. For e.g., the gas-station IoT's IoTMA may initially determine the purpose to be refueling, but during subsequent interactions, it may determine the purpose to be refueling and maintenance actions. The IoTMA updates the need for communication, and need-fulfilment-thresholds (NF-THR) based on the updated purpose and any changes in the environment. Further, the IoTGW 300B refines the IGW-WORK-PER by considering relevant changes in the environment. Such a refinement could be based on modified global perception (obtained via the ICG 300A) and changes in local perception based on the following steps:

assessment of security level of the other party (CRE) from basic communication mechanism assessment of Privacy level of the other party based on information exchange (identity proof, address proof, and the like.)

assessment of own environment conditions (local)

specific historical data for a similar context

Trustworthiness (e.g., based on updated purpose and identity proof)

At block 607, the IoTGW 300B updates interest level for the CRE in the pre-engagement communication.

The CM-MOD 304 in the IoTGW 300B determines whether the CLE is interested to involve in further communication and/or start engagement with the CRE based on the most recent IGW-WORK-PER if the determined INT-LEVEL is greater than INT-LVL-ENG-THR, then the IoTGW 300B decides to start the engagement. If the determined INT-LEVEL is lower than INT-LVL-ENG-THR but greater than INT-LVL-PRE-ENG-THR, then actions of configuring the intermediate session filter for privacy and security in the pre-engagement communication (described in block 609) are executed. If the determined INT-LEVEL is less than INT-LVL-PRE-ENG-TER, the CM-MOD 304 in the IoTGW 300B stops further communication with the CRE, informs the ICG 300A (via the CONN-MOD 302), updates local database and terminates the communication session.

At block 609, the IoTGW 300B configures the intermediate session filter for privacy and security in the pre-engagement communication.

The CM-MOD 304 in the IoTGW 300B updates the intermediate session filter (IGW-INTERIM-SESS-FILT) based on the updated purpose, updated IGW-WORK-PER and updated need by applying SFRAT to control the amount of information exposed/shared with the CRE during further information exchange. The pre-engagement communication between the CLE and the CRE then continues, and the actions from block 603 are then executed. This cycle continues until either the INT-LEVEL determined in block 607 is greater than INT-LVL-ENG-THR in which case the engagement communication is started and the steps in block 703 are executed, or the INT-LEVEL determined in block 607 is less than INT-LVL-PRE-ENG-THR in which case the CM-MOD 304 decides to terminate the communication session with the CRE.

Referring back to FIG. 4, at block 701, the ICU 300A and the IoTGW 300B, establish an engagement communication between the CRE and the CLE when the interest level is greater than a predefined interest level.

Figure 8:
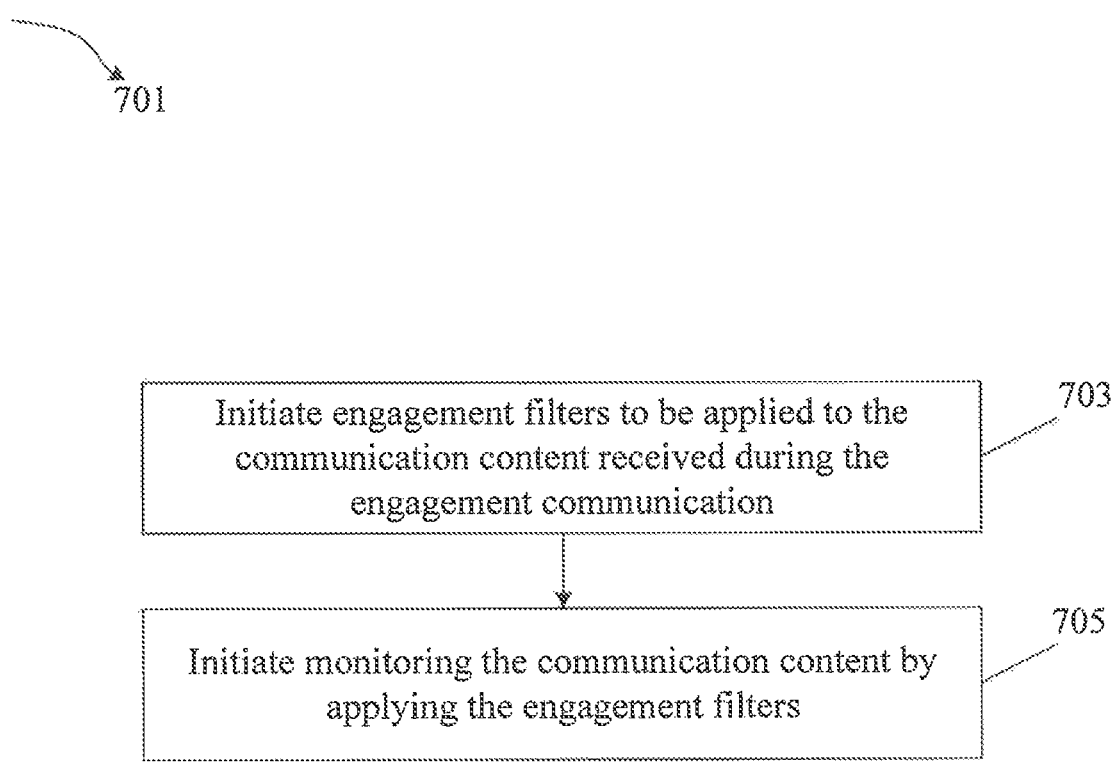

To establish the engagement communication, the ICG 300A and IoTGW 300B performs the steps illustrated in FIG. 8 at blocks 703, 705, 707.

At block 703, the ICG 300A and IoTGW 300B, initiates engagement filters to be applied to the communication content received during the engagement communication.

The CM-MOD 304 in the IoTGW 300B informs the SSM 326 in the ICG 300A of the intention to proceed with the engagement and forms an IoTGW engagement perception (IGW-ENG-PER) based on the most recent IGW-WORK-PER, assessed exposure demanded by the CRE, security level, privacy level, and the like. The CM-MOD 304 in the IoTGW 300B forms an IoTGW engagement filter (IGW-ENG-FILT) using SFRAT and based on the IGW-ENG-PER, determined purpose, and determined need for controlling the information exchanged with the CRE during the engagement communication. The CM-MOD 304 then sends the IGW-ENG-FILT to the CONN-MOD 302 for use during the engagement communication.

The SSM 326 in the ICG 300A forms an engagement perception (ICG-ENGP) to be used for the engagement communication. Based on ICG-ENGP, the SSM 326 in the ICG 300A forms the ICG engagement filter (ICG-ENG-FILT) by adapting the GFRAT for the CRE, to control the information shared with the CRE during the engagement communication.

At block 705, the ICG 300A and IoTGW 300B initiates monitoring the communication content by applying the engagement filters.

The various modules in the IoTGW 300B and the COM module 328 in the ICG initiate monitoring for any security/privacy exceptions. The IoTN/IoTGW initiates the requested engagement with the CRE (through the ICG 300A), share the required information, and provide/consume one or more services. During the engagement communication, the CONN-MOD 302 in the IoTGW 300B passes all the communication contents through the IGW-ENG-FILT before sending/processing it further and the COM 328 in the ICG 300A passes all the communication contents through the ICG-ENG-FILT before sending/processing it further.

Referring back to FIG. 4, at block 801, the ICG 300A and the IoTGW 300B maintains the engagement communication to identify one or more privacy and security related events during the exchange of communication and to identify one or more actions to handle the one or more privacy and security related events.

Figure 9:
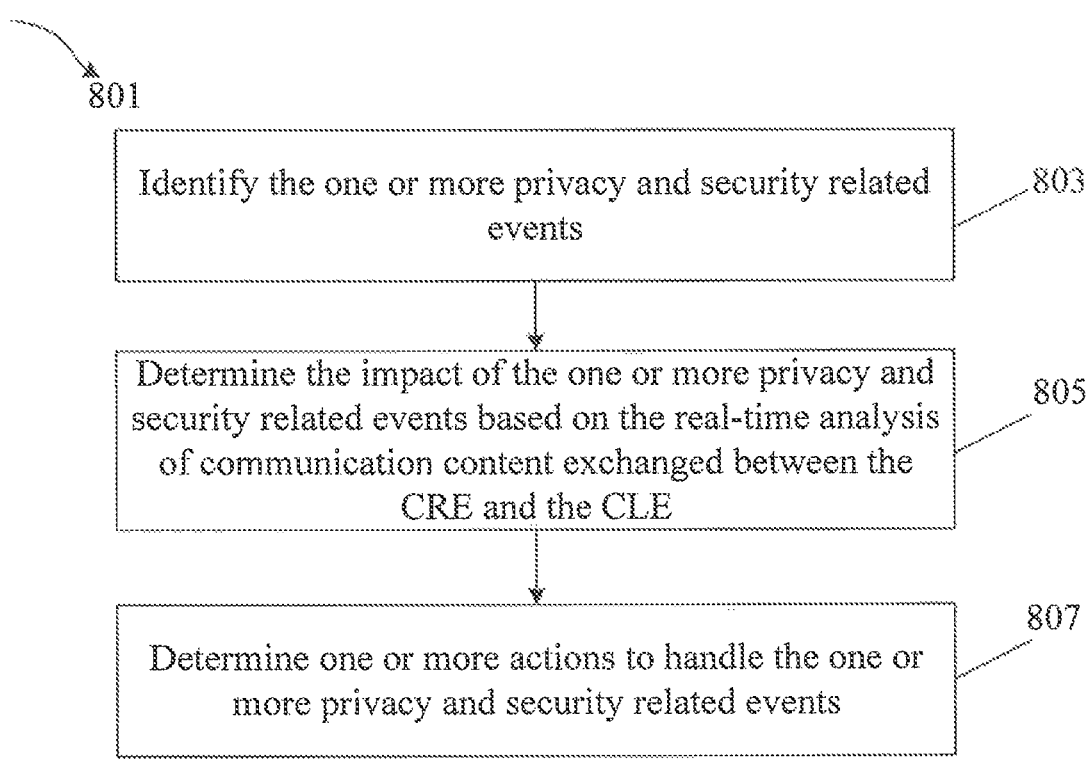

To maintain the engagement communication, the ICG 300A and the IoTGW 300B performs the steps as illustrated in the FIG. 9 at block 803, 805, 807.

Referring to FIG. 9, at block 803, the ICU 300A and the IoTGW 300B identifies the one or more privacy and security related events (SEC-PRIV-EVENT). The identification of one or more such privacy and security related events at the IoTGW 300B is based on at least one of real-time analysis of information exchange based on IoTGW engagement perception, IGW-ENG-FILT, history of engagement with the CRE or similar entities and the like; receiving notifications of exceptions related to privacy and security including policy violations. The identification of one or more such privacy and security related events at the ICG 300A is based on at least one of occurrence of any abnormal events identified based on ICG engagement perception, ICG-ENG-FILT and the like; notifications from the PME 205; and updates received from the SSM 326 based on events from other ongoing engagements via the same ICG 300A.

At block 805, the ICG 300A and the IoTGW 300B determines the impact of the one or more privacy and security related events based on the real-time analysis of the communication content exchanged between the CRE and the CLE during the engagement communication, the ICG engagement perception, IoTGW engagement perception, and previous history of engagement with the CRE.

The CM-MOD 304 in the IoTGW assesses the impact of the SEC-PRIV-EVENT on the privacy/security of the communication based on real-time analysis of information exchange until that point of time during the engagement and by taking into consideration IGW-ENG-PER, IGW-ENG-FILT, history of engagement with the specific CRE or similar entities, and the like. The impact assessment covers both engagement-level impacts as well as impacts to the IoT network, IoTGW and IoTMA functioning, and the outcome is arriving at a value for IGW-SEC-PRIV-IMPACT-LVL. For e.g., whether the security/privacy of the entire IoT network has been compromised, whether the event/exception makes the IoT network vulnerable to attacks (e.g., when a high noise level is observed in unencrypted communication), increases exposure level of the IoT network, results in abuse of IoT network resources during the engagement, and the like.

Similarly, if the COM 328 in the ICG 300A detects a privacy/security related event/exception, e.g., from the PME 205, or due to a trigger from another ongoing engagement in the ICG, and the like, it informs the SSM 326 in the ICG 300A. The SSM 326 performs an impact assessment based on real-time analysis of information exchange (relevant at ICG-level) until that point of time during the engagement and by taking into consideration ICG-ENG-PER, ICG-ENG-FILT, history of engagement with the specific CRE or similar entities, etc. The impact assessment covers both engagement-level and overall ICG functional aspects, and the outcome is arriving at a value for ICG-SEC-PRIV-IMPACT-LVL.

At block 807, the ICG 300A and the IoTGW 300B determines one or more actions to handle the one or more privacy and security related events based on the determined impact and a predefined threat factor associated with the identified one or more privacy and security related events. The one or more actions includes at least one of updating the IoTGW engagement perception, updating the ICG engagement perception, refining the IoTGW engagement filter, refining the ICG engagement filter, continuing the engagement communication and ending the engagement communication.

The CM-MOD 304 in the IoTGW 300B first determines the composite factor value, IGW-SEC-PRIV-IMPACT-THREAT-LVL for e.g., using a mechanism as illustrated below:

$$IGW\text{-}SEC\text{-}PRIV\text{-}IMPACT\text{-}THREAT\text{-}LVL = IGW\text{-}SEC\text{-}PRIV\text{-}IMPACT\text{-}LVL * IGW\text{-}SEC\text{-}PRIV\text{-}THREAT\text{-}LVL * IGW\text{-}SCF$$

Where:

IGW-SEC-PRIV-IMPACT-LVL is computed in block 805

MY-SEC-PRIV-THREAT-LVL is determined using a look-up table front a known list of exceptions (stored locally and/or updated by the IoTMA), or assigned a default median value in case of unknown exceptions.

IGW-SCF is a scaling factor whose value depends on the type of engagement (e.g., whether the IoTN is providing or consuming service from the CRE, purpose, and the like).

The CM-MOD 304 in the IoTGW 300B then checks whether the IGW-SEC-PRIV-IMPACT-THREAT-LVL is below a pre-configured threshold (SEC-PRIV-THRESHOLD), and accordingly decides to proceed further, or to terminate the engagement communication, inform the ICG 300A and execute the actions further as illustrated in block 901.

If the IGW-SEC-PRIV-IMPACT-THREAT-LVL is below a preconfigured threshold (SEC-PRIV-THRESHOLD) the CM-MOD 304 in the IoTGW 300B triggers IoTMA to make necessary updates to the purpose (if applicable) using the first method as illustrated in the previous section of the description, e.g., if the SEC-PRIV-EVENT information contradicted the information received earlier during the engagement communication which results in a modification of the purpose determined earlier. For e.g., a Car-IoT IoTGW may initially determine the purpose to be requesting authorization for payment for car refueling transaction, but receives a notification from IoTMA or an external application that payment for other services are also being requested by gas-station IoT.

The CM-MOD 304 requests the IoTMA to determine any updates to the need using the second method. The IoTGW 300B then updates the need for EXT-NEED-FULFILL based on the updated purpose, SEC-PRIV-EVENT and changes in the environment in the engagement communication.

The CM-MOD 304 in the IoTGW 300B then determines the interest level using the third method based on the updated purpose, updated need and IGW-ENG-PER. If the determined INT-LEVEL is less than ENG-INT-THR, then the CM-MOD 304 in the IoTGW 300B terminates the engagement communication, informs the ICG 300A and executes actions illustrated in block 901. Otherwise, the CM-MOD 304 in the IoTGW 300B executes the actions of updating the perception (IGW-ENG-PER).

In an embodiment, the SSM 326 in the ICG 300A determines the combined impact and threat factor value, MG-SEC-PRIV-IMPACT-THREAT-LVL for e.g., using a mechanism as illustrated below:

$$ICG\text{-}SEC\text{-}PRIV\text{-}IMPACT\text{-}THREAT\text{-}LVL = ICG\text{-}SEC\text{-}PRIV\text{-}IMPACT\text{-}LVL * ICG\text{-}SEC\text{-}PRIV\text{-}THREAT\text{-}LVL$$

where ICG-SEC-PRIV-IMPACT-LVL is computed in block 805 above and ICG-SEC-PRIV-THREAT-LVL is determined using a look-up table from a known list of exceptions, or assigned a default median value in case of unknown exceptions.

The SSM 326 in the ICG 300A then checks if the ICG-SEC-PRIV-IMPACT-THREAT-LVL is below a pre-configured threshold (SEC-PRIV-THRESHOLD), if yes, it proceeds to the steps below, otherwise, it terminates the engagement communication, informs the IoTGW 300B and executes actions illustrated in block 901.

The one or more actions includes at least one of updating the IoTGW engagement perception, updating the ICU engagement perception, refining the IoTGW engagement filter, refining the ICG engagement filter, continuing the engagement communication and ending the engagement communication.

The IoTGW 300B updates the IGW-ENG-PER based on the updated interest level, updated purpose, SEC-PRIV-EVENT and any change in environment during the engagement communication. Such updates could include updates to the assessed identity of the CRE, exposure demanded by the CRE, security compliance record, privacy compliance record, and the like.

The SSM 326 in the ICG 300A updates the ICG-ENGP based on SEC-PRIV-EVENT and any change in environment during the engagement communication. Such updates could include updating the usual security level of the CRE, usual privacy level of the CRE, and the like. The 300B and the SSM 326 in the ICG 300A also stores relevant information about the SEC-PRIV-EVENT and actions taken in the historical data for the engagement. Further, the CM-MOD 304 in the IoTGW 300B update IGW-ENG-FILT for controlling the information shared with the CRE during the engagement communication based on the updated IGW-ENG-PER. The SSM 326 in the ICG 300A updates the ICG-ENG-FILT for controlling the information shared with the CRE during the engagement communication based on the ICG-ENGP. The engagement between the CLE and the CRE then continues further, and the process of tracking the engagement communication continues until the engagement is terminated.

Referring back to FIG. 4, At block 901, the ICG 300A and IoTGW 300B terminates the engagement communication upon handling the one or more privacy and security related events.

Figure 10:
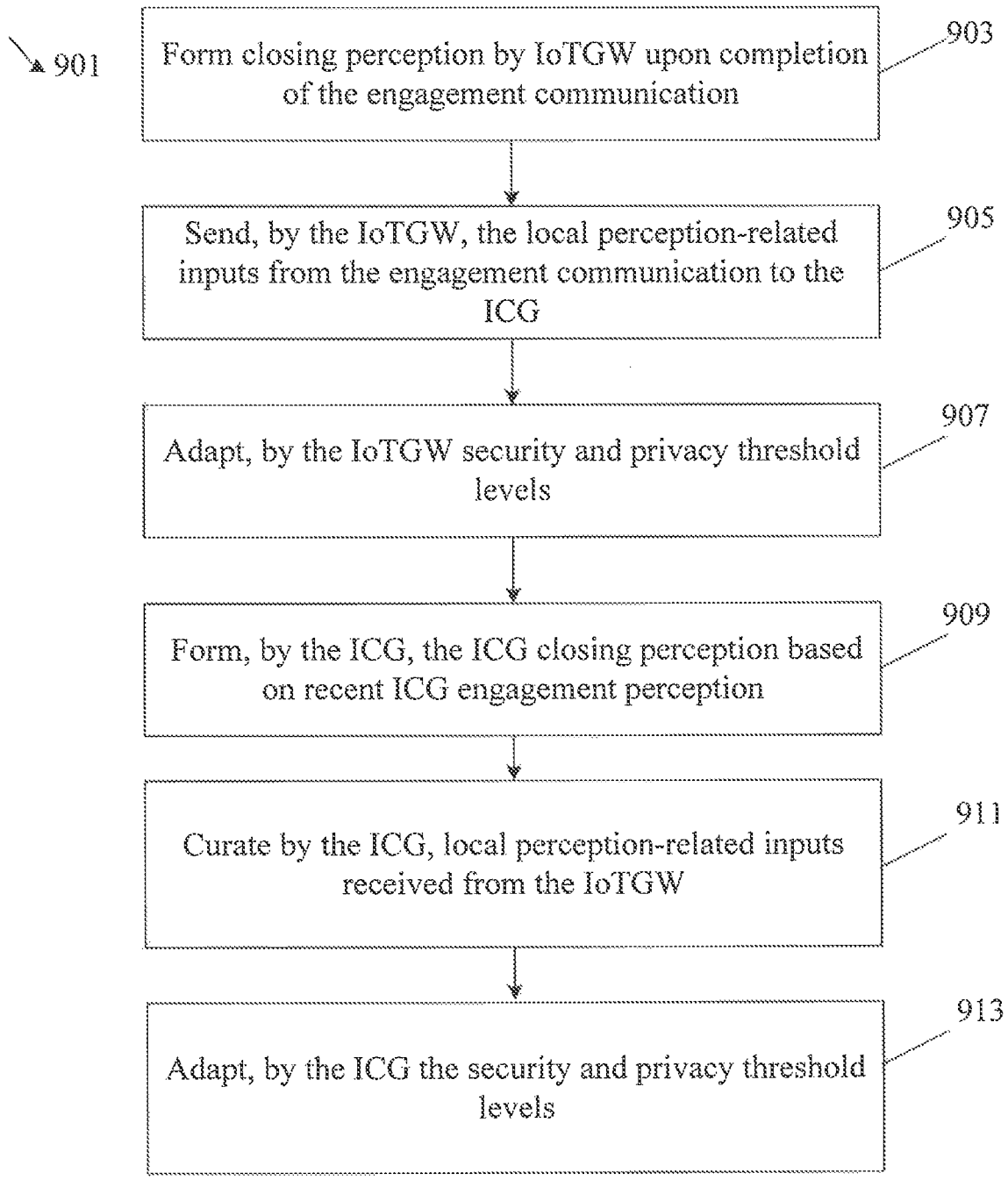

The ICG 300A and the IoTGW 300E terminates the engagement communication by performing steps as illustrated in FIG. 10 at blocks 903, 905, 907, 909, 911, 913.

ICG 300A and the IoTGW 300B terminates the engagement communication when the one or more actions are undertaken or upon fulfilment of purpose of communication (normal communication end). The one or more actions are undertaken when an exception is occurred due to non-compliance of the security and privacy during the engagement communication.

Referring to FIG. 10, at block 903, the IoTGW 300B forms IoTGW closing perception (IGW-CLOSING-PER) based on recent IoTGW engagement perception and fulfilment of the need upon completion of the engagement communication.

The CM-MOD 304 in the IoTGW 300B forms the IGW-CLOSING-PER about the CRE and sends it to the IoTMA for storing. IGW-CLOSING-PER is used to determine the IGW-INIT-PER for future engagements. The IoTMA then updates attributes such as capability of the CRE, and the like, and stores it.

At block 905, the IoTGW 300B sends local perception-related inputs from the engagement communication to the ICG 300A.

At block 907, the IoTGW 300B adapts security and privacy threshold levels (SEC-PRIV-THRESHOLD) based on number and type of occurrences of one or more privacy and security related events during the engagement communication and extent of need fulfillment.

At block 909, the ICG 300A forms ICG closing perception (ICG-POST-ENGP) based on recent ICU engagement perception. The SSM 326 in the ICG 300A forms ICG-POST-ENGP about the CRE based on the latest ICG-ENGP which is then used for forming ICG-PRE-ENGP for future engagements. The ICG-POST-ENGP is sent to the PME 205 and stored in local database.

At block 911, the ICG 300A curates/updates local perception-related inputs received from the IoTGW 300B and sends the curated perception information to the PME 205 wherein curating includes at least one of removing IoT functional aspects of the perception, and computing aggregates of privacy/security exceptions.

At block 913, the ICG 300A adapts the security and privacy threshold levels (SEC-PRIV-THRESHOLD) based on number and type of occurrences of one or more privacy and security related events during the engagement communication.

In an embodiment, the ICG 300A and IoTGW 300B updates/refines the perceptions, thresholds for the CRE based on the privacy and security level of the CRE during the pre-engagement and the engagement communication. The updated/refined perceptions and thresholds may be used for future engagement with the CRE.

Advantages of the Embodiment of the Present Disclosure are Illustrated Herein

In an embodiment, the present disclosure provides a method and system for dynamically adapting privacy and security for IoT communication.

The present disclosure discloses the aspect of forming perceptions and based on perceptions determining whether to allow pre-engagement communication between the entities. Due to this, even at the pre-engagement communication level, the present disclosure provides security for the communication.

The present disclosure dynamically adapts to security and privacy level based on changes in context and purpose of the communication.

The present disclosure provides one or more actions to adapt to the changed context and purpose during the communication.

The present disclosure provides an effective IoT communication since the present disclosure fulfills the purpose of communication by considering the privacy and security aspects.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustra-

REFERRAL NUMERALS

| Reference Number | Description |
| --- | --- |
| 100 | Environment |
| 102 | IoT Network (Car IoT network) |
| 104 | IoT Network (Home IoT Network) |
| 108, 116 | Gateway |
| 110, 208 | Macro Cellular and Core Network (MCN) |
| 118, 120, 218, 222, 220 | IoT Applications (IoTMA) |
| 114 | IoT Network (Gas Station IoT network) |
| 200 | IoT System |
| 202, 204, 216, 300B | IoT Gateway (IoTGW) |
| 206, 212, 300A | Inter Connect Gateway (ICG) |
| 210 | Network Wide Database (NWDB) |
| 308 | IoTN Interface |
| 310 | IoTNext Interface |
| 312 | IoTGW Processor |
| 314 | IoTGW Memory |
| 302 | Connection module |
| 304 | Communication Module (IoTGW) |
| 318, 338 | Other Part of Network (OPON) |
| 320 | IoTGW Interface |
| 322 | MCN Interface |
| 324 | ICG Processor |
| 336 | ICG Memory |
| 326 | Session and Service Module |
| 330 | Policy Module |
| 328 | Communication Module(ICG|) |
| 334 | Administration and Security (ADM & SEC) Module |

The invention claimed is:

1. A method for dynamically adapting privacy and security for Internet of Things (IoT) communication, the method comprising:
    handling, by an Interconnect Gateway (ICG) of a Communicating Local Entity (CLE), a communication request received from a Communicating Remote Entity (CRE) by determining communication requirement, based on ICG communication-policy;
    performing, by the ICG and an IoT Gateway (IoTGW), a pre-engagement communication between the CRE and the CLE for exchange of information upon determining the communication requirement, wherein the IoTGW is communicatively coupled to each of the ICG and the CLE;
    maintaining, by the ICG and the IoTGW, the pre-engagement communication during the exchange of information between the CRE and the CLE;
    establishing, by the ICG and the IoTGW, an engagement communication between the CRE and the CLE, wherein the IoTGW establishes the engagement communication when an interest level during the exchange of information is greater than a predefined interest level;
    maintaining, by the ICG and the IoTGW, the engagement communication to identify one or more privacy and security related events during the exchange of communication and to identify one or more actions to handle the one or more privacy and security related events; and
    terminating, by the ICG and the IoTGW, the engagement communication when at least one of actions are undertaken on the one or more privacy and security related events or upon completion of the engagement communication.

2. The method as claimed in claim 1, wherein performing the pre-engagement communication comprises:
    determining, by the ICG and IoTGW, allowance of the pre-engagement communication;
    determining, by an IoT Management application (IoTMA) associated with the IoTGW, purpose and need for the pre-engagement communication;
    determining, by the IoTGW, interest level for the pre-engagement communication; and
    initializing session filter for privacy and security compliance during the pre-engagement communication.

3. The method as claimed in claim 2, wherein determining the allowance of the pre-engagement communication comprises:
    forming, by the ICG, a pre-engagement perception for the CRE based on ICG local perception and ICG global perception, corresponding to identity information of the CRE, wherein the pre-engagement perception is associated with a privacy and security compliance level;
    determining, by the ICG, the allowance of the pre-engagement communication when the privacy and the security compliance level is greater than a predefined ICG initial communication allowance threshold level;
    forming, by the IoTGW, an initial perception for the CRE based on IoTGW local perception and IoTGW global perception, obtained based on the identity information of the CRE and type of the communication request, wherein the initial perception is associated with a communication allowance level; and
    determining, by the IoTGW, the allowance of the pre-engagement communication when the communication allowance level is greater than a predefined IoTGW initial communication allowance threshold level.

4. The method as claimed in claim 3, wherein the ICG local perception is obtained from the IoTGW if at least one of the ICG local perception is unavailable in the memory of ICG or the ICG local perception present in the memory of ICG is stale, and wherein the ICG global perception is obtained from a Perception Management Entity (PME) associated with the ICG if at least one of the ICG global perception is unavailable in the memory of ICG or the ICG global perception present in the memory of ICG is stale.

5. The method as claimed in claim 3, wherein the IoTGW local perception is obtained from a IoT Management Application (IoTMA) associated with the IoTGW if at least one of the IoTGW local perception is unavailable in the memory of IoTGW or the IoTGW local perception present in the memory of IoTGW is stale, and wherein the IoTGW global perception is obtained from the ICG if at least one of the IoTGW global perception is unavailable in the memory of IoTGW or the IoTGW global perception present in the memory of IoTGW is stale.

6. The method as claimed in claim 3, wherein determining the privacy and security compliance level comprises:
    triggering, by the IoTGW, the IoTMA to update the need-fulfillment threshold and the need and purpose of the pre-engagement communication, wherein the IoTMA is triggered based on at least one of periodically, upon receipt of additional information based on the communication content exchanged during the pre-engagement communication, from the CRE and detecting change in environment during the pre-engagement communication; and
    refining, by the IoTGW, the working perception upon detecting change in the IoTGW global perception.

7. The method as claimed in claim 6, wherein the environment includes location and surrounding of the CRE and the CLE and communication channel between the CRE and CLE.

8. The method as claimed in claim 2, wherein,
determining the purpose for the pre-engagement communication is based on contents of the communication request, historical data associated with previous communication of the CRE with the CLE and one or more exceptions encountered during the previous communication;
determining the need for the pre-engagement communication is achieved by matching the determined purpose with existing list of needs along with need threshold values, wherein the existing list of needs is maintained by the IoTMA based on at least one of functional and service need associated with IoT Network (IoTN) of the CRE; and
determining need-fulfillment threshold by comparing ability of the CRE to fulfil the need (NFA) with the need-threshold values, wherein the NFA is determined based on need-fulfillment track record (NFTR) of the CRE and information exchanged during the pre-engagement communication.

9. The method as claimed in claim 8, wherein determining the interest level comprises:
determining need-fulfillment confidence level (NFCL) by comparing the NFTR with the need-fulfillment threshold; and
determining the interest level by combining the NFCL and one or more security and privacy attributes in the initial perception.

10. The method as claimed in claim 2, wherein initializing the session filter for privacy and security compliance during the pre-engagement communication comprises:
forming, by the ICG, a pre-engagement session filter using specific rules and thresholds (SRT) of the CRE, wherein the SRT is formed by associating rules and thresholds in global filter rules and thresholds (GFRAT) with the pre-engagement perception, wherein the GFRAT is obtained from the PME;
forming, by the IoTGW, a working perception based on the initial perception by assessing the privacy and the security compliance level during the pre-engagement communication;
forming, by the IoTGW, an initial session filter by associating the rules and thresholds in the GFRAT, obtained from the ICG, with the working perception and by adapting the rules and thresholds based on specific filter rules and threshold adaptations (SFRAT) obtained from the IoTMA associated with the IoTGW; and
initializing, by the IoTGW, an intermediate session filter with values of the initial session filter.

11. The method as claimed in claim 10, wherein configuring the intermediate session filter comprises updating the intermediate session filter by associating the rules and thresholds in the GFRAT with the working perception and by adapting the rules and thresholds based on recent SFRAT obtained from the IoTMA.

12. The method as claimed in claim 2, wherein updating the interest level for the pre-engagement communication is done by combining the updated NFCL and one or more privacy and security attributes in the refined working perception, wherein the updated NFCL is determined by comparing the updated NFTR with the updated need-fulfillment threshold.

13. The method as claimed in claim 1, wherein maintaining the pre-engagement communication comprises:
tracking, by the ICG and IoTGW, communication exchange between the CLE and the CRE during the pre-engagement communication;
determining, by the IoTGW, the privacy and security compliance level during the pre-engagement communication;
updating, by the IoTGW, interest level for the CRE in the pre-engagement communication; and
configuring, by the IoTGW, intermediate session filter for privacy and security in the pre-engagement communication.

14. The method as claimed in claim 13, wherein maintaining the engagement communication comprises:
identifying, by the IoTGW, the one or more privacy and security related events based on at least one of exceptions, policy violations, real-time analysis of the communication content exchanged based on the IoTGW engagement perception;
identifying, by the ICG, the one or more privacy and security related events based on at least one of exceptions, abnormal situations, notifications received from the PME;
determining, by the ICG, ICG based impact of the one or more privacy and security related events based on the real-time analysis of the communication content exchanged between the CRE and the CLE during the engagement communication, the ICG engagement perception, previous history of engagement with the CRE;
determining, by the ICG, one or more actions to handle the one or more privacy and security related events based on the determined ICG based impact and a predefined threat factor associated with the identified one or more privacy and security related events and comparing it with configured security-privacy threshold values (SEC-PRIV-THRESHOLD);
determining, by the IoTGW, IoTGW based impact of the one or more privacy and security related events based on the real-time analysis of the communication content exchanged between the CRE and the CLE during the engagement communication, the IoTGW engagement perception, previous history of engagement with the CRE; and
determining, by the IoTGW, one or more actions to handle the one or more privacy and security related events based on the determined IoTGW based impact and a predefined threat factor associated with the identified one or more privacy and security related events and comparing it with configured security-privacy threshold levels (SEC-PRIV-THRESHOLD).

15. The method as claimed in the claim 14, wherein the one or more actions by ICG include at least one of:
updating, by the ICG, ICG engagement perception based on at least one of the identified one or more privacy and security related events and any change in the environment;
refining, by the ICG, ICG engagement filter by associating the specific rules and thresholds obtained from the GFRAT with the updated ICG engagement perception;
continuing, by the ICG, the engagement communication, and
terminating by the ICG, the engagement communication.

16. The method as claimed in claim 15, wherein terminating the engagement communication comprises:

forming, by the IoTGW, IoTGW closing perception based on recent IoTGW engagement perception and fulfillment of the need upon completion of the engagement communication;

sending by the IoTGW, local perception-related inputs from the engagement communication to the ICG;

adapting, by the IoTGW, the security and privacy threshold levels (SEC-PRIV-THRESHOLD based on number and type of occurrences of one or more privacy and security related events during the engagement communication and extent of need fulfillment;

forming, by the ICG, the ICG closing perception based on recent ICG engagement perception;

curating, by the ICG, local perception-related inputs received from the IoTGW, and sending the curated perception information to the PME wherein curating includes at least one of removing IoT functional aspects of the perception, and computing aggregates of privacy and security exceptions; and adapting, by the ICG, the security and privacy threshold levels (SEC-PRIV-THRESHOLD) based on number and type of occurrences of one or more privacy and security related events during the engagement communication.

17. The method as claimed in the claim 14, wherein the one or more actions by IoTGW include at least one of:

updating, by the IoTGW, IoTGW engagement perception based on at least one of updated purpose, the identified one or more privacy and security related events and any change in the environment, wherein the updated purpose is determined by the IoTMA associated with the IoTGW based on information that was received from the CRE during the engagement which contradicted the information received earlier from the CRE;

refining, by the IoTGW, IoTGW engagement filter based on updated IoTGW engagement perception and recent SFRAT obtained from the IoTMA;

continuing by the IoTGW, the engagement communication; and terminating by the IoTGW, the engagement communication.

18. The method as claimed in claim 1, wherein tracking the communication exchange between the CLE and the CRE during the pre-engagement communication comprises:

applying, by the ICG, the pre-engagement session filter on communication content exchanged during the pre-engagement communication; and applying, by the IoTGW, the intermediate session filter on the communication content.

19. The method as claimed in claim 1, wherein establishing the engagement communication between the CRE and the CLE comprises:

initializing, by the IoTGW and the ICG, engagement filters to be applied to the communication content exchanged during the engagement communication; and initiate monitoring, by the ICG and the IoTGW, the communication content by applying the engagement filters.

20. The method as claimed in the claim 19, wherein initializing the engagement filters comprises:

forming, by the ICG, an ICG engagement perception based on the pre-engagement perception and one or more privacy and security related events during the pre-engagement communication;

forming, by the ICG, an ICG engagement filter using specific rules and thresholds (SRT) of the CRE, wherein the SRT is formed by associating rules and thresholds in global filter rules and thresholds (GFRAT) with the ICG engagement perception, wherein the GFRAT is obtained from the PME;

forming, by the IoTGW, an IoTGW engagement perception based on the most recent working perception by assessing the privacy and the security compliance level and the exposure demanded by the CRE; and forming, by the IoTGW, an IoTGW engagement filter by associating the rules and thresholds in the GFRAT, obtained from the ICG, with the IoTGW engagement perception and by adapting the rules and thresholds based on specific filter rules and threshold adaptations (SFRAT) obtained from IoT Management Application (IoTMA) associated with the IoTGW.

21. The method as claimed in claim 20, wherein initiating monitoring of the communication content is by applying the ICG engagement filter and the IoTGW engagement filter on the communication content.

22. An Interconnect Gateway (ICG) of a Communicating Local Entity (CLE) for dynamically adapting privacy and security for Internet of Things (IoT) communication, the ICG comprising:

an IoT Gateway (IoTGW) interface communicably connected to an IoTGW, wherein the IoTGW is communicatively coupled to each of the ICG and the CLE;

Macro cellular and Core Network (MCN) Interface communicably connected with a Communicating Remote Entity (CRE) for receiving a communication request from the CRE;

ICG memory configured to store information related to threshold and configuration settings, topology and connectivity information associated with IoT network and ICG local perception and ICG global perception, and a set of ICG instructions; and ICG processor configured to execute the set of ICG instructions to perform a method, the method comprising:

handling the communication request received from the CRE by determining communication requirement, based on ICG communication-policy;

performing a pre-engagement communication between the CRE and the CLE for exchange of information upon determining the communication requirement;

maintaining the pre-engagement communication by tracking the exchange of information between the CRE and the CLE during the pre-engagement communication;

establishing an engagement communication between the CRE and the CLE;

maintaining the engagement communication to identify one or more privacy and security related events during the exchange of communication and to identify one or more actions to handle the one or more privacy and security related events; and terminating the engagement communication when at least one of actions are undertaken on the one or more privacy and security related events or upon completion of the engagement communication.

23. The ICG as claimed in claim 22, wherein the ICG obtains the ICG global perception from an associated Perception Management Entity (PME) if at least one of the ICG global perception is unavailable in a memory of ICG or the ICG global perception present in the memory of ICG is stale.

24. The ICG as claimed in claim 22, wherein the ICG obtains the ICG local perception from the IoTGW if at least one of the ICG local perception is unavailable in a memory of ICG or the ICG local perception present in the memory of ICG is stale.

25. The ICG as claimed in claim 22, wherein the set of ICG instructions includes Session and Service (SSM) instructions, policy instructions, communication instructions and Administration and Security (ADMSEC) instructions.

26. The ICG as claimed in claim 25, wherein the ICG processor is further configured to execute the SSM instructions to perform:
    forming ICG-level perception upon receiving the communication request until completion of the pre-engagement and the engagement communication;
    analyzing impact of the one or more privacy and security related events;
    forming pre-engagement session filter and ICG engagement filter; and
    preparing a summary report of the communication between the CLE and the CRE, wherein the summary report includes information related to the identified one or more privacy and security related events and the one or more actions to handle the one or more privacy and security related events.

27. The ICG as claimed in claim 26, wherein forming the ICG-level perception further comprises:
    forming a pre-engagement perception during the pre-engagement communication between the CLE and the CRE based on historical perception data associated with previous communication with the CRE and the ICG global perception received from the PME;
    forming an ICG engagement perception for the CRE during the engagement communication between the CLE and the CRE based on the pre-engagement perception and the number and type of the identified one or more privacy and security related events; and
    forming an ICG closing perception upon completion of the engagement communication between the CLE and the CRE based on recent ICG engagement perception and number and type of the identified one or more privacy and security related events.

28. The ICG as claimed in claim 26, wherein the method further comprises analyzing the impact of the one or more privacy and security related events by determining impact level based on the pre-engagement perception, the pre-engagement session filter and previous history of engagement with the CRE.

29. The ICG as claimed in claim 25, wherein the ICG processor is further configured to execute the policy instructions to perform:
    updating one or more policies related to privacy and security during communication between the CLE and CRE received from an operator associated with the CLE.

30. The ICG as claimed in claim 25, wherein the ICG processor is further configured to execute the communication instructions to perform:
    determining allowance of the pre-engagement communication between the CLE and the CRE based on the pre-engagement perception;
    obtaining the pre-engagement session filter and ICG engagement filter from the SSM and apply the pre-engagement session filter and ICG engagement filter during the pre-engagement communication and the engagement communication respectively;
    providing information related to the one or more privacy and security related events and information related to the perception information to the SSM; and
    performing the one or more actions upon identifying the one or more privacy and security related events.

31. The ICG as claimed in claim 25, wherein the ICG processor is further configured to execute the ADMSEC instructions to perform:
    obtaining the ICG global perception from the PME and provide the ICG global perception to the IoTGW upon receiving a request from the IoTGW; and
    determine one or more actions to ensure security of communication channel between the CLE and the CRE and the communication content.

32. The ICG as claimed in claim 22, wherein the information related to the threshold and configuration settings includes predefined ICG initial communication allowance threshold level used to determine allowance of the pre-engagement communication between the CLE and the CRE and security privacy threshold level.

33. An IoT Gateway (IoTGW) of a Communicating Local Entity (CLE) for dynamically adapting privacy and security for Internet of Things (IoT) communication, the IoTGW comprising:
    an IoT network (IoTN) interface communicably connected with the CRE;
    an IoTNext Interface communicably connected with the ICG to receive the communication request;
    IoTGW memory configured to store information related to threshold and configuration settings, topology and connectivity information associated with the IoT network and IoTGW local perception and IoTGW global perception, and a set of IoTGW instructions;
    IoTGW processor configured to execute the set of IoTGW instructions to perform a method, the method comprising:
        performing a pre-engagement communication between the CRE and the CLE for exchange of information upon receiving the communication request;
        maintaining the pre-engagement communication to monitor interest level during the exchange of information between the CRE and the CLE;
        establishing an engagement communication between the CRE and the CLE when the interest level is greater than a predefined interest level;
        maintaining the engagement communication to identify one or more privacy and security related events related to privacy and security compliance during the exchange of communication and to identify one or more actions to handle the one or more privacy and security related events; and
        terminating the engagement communication when at least one of actions are undertaken on the one or more privacy and security related events or upon completion of the engagement communication.

34. The IoTGW as claimed in claim 33, wherein the IoTGW obtains the IoTGW local perception from a IoT Management Application (IoTMA) associated with the IoTGW if at least one of the IoTGW local perception is unavailable in a memory of the IoTGW or the IoTGW local perception present in the memory of IoTGW is stale.

35. The IoTGW as claimed in claim 34, wherein the IoTMA is configured to:
    determine purpose of the communication and the need for the communication with the CRE during the pre-engagement communication;

update the purpose and the need during the pre-engagement communication and during the engagement communication with the CRE;

determine and update extent of need fulfillment (EXT-NEED-FULFILL) prior to the engagement communication and during the engagement communication based on the purpose and need;

provide inputs and thresholds to the IoTGW to determine interest level of the CRE for the communication with the CLE, the filters to be used before and during the engagement communication;

consolidate information, received from the IoTGW on termination of the engagement communication, related to the IoTGW local perception; and facilitate the IoTGW to form perceptions and to analyze impact of the one or more privacy and security related events.

36. The IoTGW as claimed in claim 33, wherein the IoTGW obtains the IoTGW global perception from the ICG if at least one of the IoTGW global perception is unavailable in a memory of IoTGW or the IoTGW global perception present in the memory of IoTGW is stale.

37. The IoTGW as claimed in claim 33, wherein the set of IoTGW instructions includes communication instructions and connection instructions.

38. The IoTGW as claimed in claim 37, wherein the IoTGW processor is further configured to execute the communication instructions to perform:

forming IoTGW-level perception upon receiving the communication request until the pre-engagement communication is terminated;

determining the allowance of the pre-engagement communication;

determining interest level of the CRE in the pre-engagement communication based on purpose and need of the communication with the CRE;

forming initial session filter, intermediate session filter and IoTGW engagement filter;

analyzing impact level of the one or more privacy and security related events during the pre-engagement communication; and preparing a summary report of the communication between the CLE and the CRE, wherein the summary report includes information related to the identified one or more privacy and security related events and the one or more actions to handle the one or more privacy and security related events.

39. The IoTGW as claimed in claim 38, wherein forming the IoTGW-level perception further comprises:

forming initial perception upon receiving the communication request;

forming working perception during the pre-engagement communication with the CRE until beginning of the engagement communication;

forming IoTGW engagement perception during the engagement communication with the CRE until the termination of the engagement communication; and forming IoTGW closing perception during termination of one of the pre-engagement communication and the engagement communication.

40. The IoTGW as claimed in claim 37, wherein the IoTGW processor is further configured to execute the connection instructions to perform:

applying the intermediate session filter and the IoTGW engagement filter during the pre-engagement communication and the engagement communication respectively; and reporting the one or more privacy and security related events to the SSM; and performing one or more actions on the identified one or more privacy and security related events upon receiving an instruction from the SSM.

* * * * *